United States Patent
Liao et al.

(10) Patent No.: US 11,521,566 B2
(45) Date of Patent: Dec. 6, 2022

(54) DISPLAY PANEL AND ELECTRONIC DEVICE

(71) Applicant: SHENZHEN CHINA STAR OPTOELECTRONICS SEMICONDUCTOR DISPLAY TECHNOLOGY CO., LTD., Shenzhen (CN)

(72) Inventors: Huihua Liao, Shenzhen (CN); Juncheng Xiao, Shenzhen (CN); Bin Zhao, Shenzhen (CN); Xin Zhang, Shenzhen (CN); Jun Zhao, Shenzhen (CN)

(*) Notice: Subject to any disclaimer, the term of this patent is extended or adjusted under 35 U.S.C. 154(b) by 159 days.

(21) Appl. No.: 16/767,481

(22) PCT Filed: Apr. 30, 2020

(86) PCT No.: PCT/CN2020/087980
§ 371 (c)(1),
(2) Date: May 27, 2020

(87) PCT Pub. No.: WO2021/189596
PCT Pub. Date: Sep. 30, 2021

(65) Prior Publication Data
US 2022/0122554 A1   Apr. 21, 2022

(30) Foreign Application Priority Data
Mar. 22, 2020 (CN) .......................... 202010204831.6

(51) Int. Cl.
*G09G 3/36* (2006.01)
*G02F 1/1362* (2006.01)
(Continued)

(52) U.S. Cl.
CPC .......... *G09G 3/36* (2013.01); *G02F 1/13306* (2013.01); *G02F 1/13394* (2013.01);
(Continued)

(58) Field of Classification Search
CPC ............. G09G 3/36; G09G 2300/0408; G09G 2310/061; G09G 2310/08; G09G 3/3674;
(Continued)

(56) References Cited

U.S. PATENT DOCUMENTS

| | | | |
|---|---|---|---|
| 2010/0079443 A1 | 4/2010 | Chang et al. | |
| 2013/0057820 A1* | 3/2013 | Hyodo | G02F 1/1337 349/155 |

(Continued)

FOREIGN PATENT DOCUMENTS

| CN | 102981315 A | 3/2013 |
|---|---|---|
| CN | 103901670 A | 7/2014 |

(Continued)

*Primary Examiner* — Roy P Rabindranath

(57) ABSTRACT

The present disclosure provides a display panel and an electronic device. In the display panel, a contact area between a support pillar and a bottom layer is increased, without changing a size of a single sub-pixel, thereby alleviating a technical problem that the support pillar easily peels off in an existing 8K ultra-high-resolution electronic device. Moreover, by adjusting voltage drop values of clock input transistors in different GOA units, the voltage drop value between each of the GOA units and clock driving chips is approximately the same.

18 Claims, 18 Drawing Sheets

(51) Int. Cl.
*G02F 1/1333* (2006.01)
*G02F 1/133* (2006.01)
*G02F 1/1339* (2006.01)
*G02F 1/1345* (2006.01)

(52) U.S. Cl.
CPC .... *G02F 1/13454* (2013.01); *G02F 1/133357* (2021.01); *G02F 1/136209* (2013.01); *G02F 1/136222* (2021.01); *G09G 2300/0408* (2013.01); *G09G 2310/061* (2013.01); *G09G 2310/08* (2013.01)

(58) Field of Classification Search
CPC ............ G09G 3/3677; G02F 1/136222; G02F 1/133357; G02F 1/13306; G02F 1/13394; G02F 1/13454; G02F 1/136209
See application file for complete search history.

(56) References Cited

U.S. PATENT DOCUMENTS

| | | | |
|---|---|---|---|
| 2014/0034950 A1* | 2/2014 | Li | H01L 27/1255 257/53 |
| 2015/0357356 A1* | 12/2015 | Kim | H01L 29/7869 257/43 |
| 2017/0005199 A1* | 1/2017 | Lin | H01L 29/24 |
| 2017/0301702 A1* | 10/2017 | Kim | G09G 3/3688 |
| 2018/0166018 A1* | 6/2018 | Yang | G09G 3/3266 |
| 2021/0327377 A1* | 10/2021 | Du | G09G 3/3266 |

FOREIGN PATENT DOCUMENTS

| | | |
|---|---|---|
| CN | 104238197 A | 12/2014 |
| CN | 104536229 A | 4/2015 |
| CN | 105044946 A | 11/2015 |

* cited by examiner

DISPLAY PANEL AND ELECTRONIC DEVICE

FIELD OF INVENTION

The present disclosure relates to the technical field of displays, and in particular to a display panel and an electronic device.

BACKGROUND OF DISCLOSURE

With the development of display technology, the resolution of electronic devices, such as display screens, TVs, and mobile phones, is getting higher and higher. The number of pixels increases corresponding to the increase in resolution. The increase in the number of the pixels brings various technical challenges required to be overcome.

For example, the area of a single sub-pixel of an 8K resolution electronic device is one-quarter of the area of a single sub-pixel of a 4K resolution electronic device, accompanied by a reduction in the contact area between a support pillar (ps) and a bottom layer in the panel. In the 8K resolution electronic devices, the contact area between the support pillar and the bottom layer is 20 µm*20 µm or even smaller. Such a small contact area causes the support pillar to easily peel off from the bottom layer, and the peeling of the support pillars causes the problems, such as blank edges occurring to the liquid crystals and abnormal pressure on the whole surface.

Moreover, loading (voltage drop) of the 8K ultra-high-resolution electronic device is serious, the charging time is short, and it is driven by a gate on array (GOA, the gate drive circuit is integrated onto the array substrate) and thick copper design, so that the ultra-high resolution electronic device is extremely sensitive to the impedance difference between clock (CK) signals in GOA. The resolution of the 8K electronic device is 7680*4320, there are a total of 4320 rows of GOA units, and a GOA drive architecture employs 12 CK signal lines (that is, 12 clock signal lines). The impedance difference of the CK signal lines can reach the level of thousands of ohms. As a result, there is a difference between the CK pattern and the scan line waveform output from the corresponding GOA units, which in turn causes problems, such as horizontal lines occurring to the panel display.

Therefore, the existing 8K ultra-high-resolution electronic device has at least the technical problems that the support pillars easily peel off, and the difference in CK impedance causes the difference in the output signals of the GOA units. The problems need to be improved.

SUMMARY OF INVENTION

Technical Problems

The present disclosure provides a display panel and an electronic device to alleviate the technical problems in the existing 8K ultra-high-resolution electronic device that the support pillar easily peels off, and the difference in CK impedance causes the difference in the output signal of the GOA units.

Technical Solutions

To solve the above problems, the technical solutions provided by this application are as follows:

The present disclosure provides a display panel including:
a first substrate;
a second substrate disposed opposite the first substrate;
a support pillar formed on the first substrate; and
a liquid crystal filled in a sealed space formed between the first substrate and the second substrate;
wherein in a contact region contacting the support pillar, a contact layer of the first substrate contacting the support pillar forms a protrusion-depression pattern, the protrusion-depression pattern increases a contact area between the contact layer and the support pillar, and the protrusion-depression pattern includes a target pattern formed by at least one of protrusions, depressions, or a combination of protrusions and depressions of the contact layer;
in a non-display area, the display panel is also provided with:
m GOA units arranged in a column direction, wherein each of the GOA units includes a pull-up module, and each of the pull-up modules includes a clock input transistor connected to a clock signal;
n clock signal lines extending in the column direction and arranged in parallel; and
m clock signal connection lines extending in a row direction and arranged in parallel, wherein the clock signal connection lines have one-to-one correspondence to the GOA units, for connecting the clock input transistor of the pull-up module in each of the GOA units to a corresponding one of the clock signal lines;
wherein the n clock signal lines include an clock signal line n1 and an clock signal line n2, the clock signal line n2 is formed near a side of the clock signal line n1 away from the GOA units, and a voltage drop value connected to the clock input transistor of the pull-up module in the GOA unit m1 of the clock signal line n1 is greater than a voltage drop value connected to the clock input transistor of the pull-up module in the GOA unit m2 of the clock signal line n2.

In a display panel of the present disclosure, each of the clock input transistors includes a plurality of sub-transistors connected in an array, and a number of the sub-transistors of the clock input transistor of the pull-up module in the GOA unit m1 is greater than a number of the sub-transistors of the clock input transistor of the pull-up module in the GOA unit m2.

In a display panel of the present disclosure, the GOA unit n includes:
a pull-up control module connected to a first node, and configured to pull up a potential of the first node during a display period;
a logical addressing module including a second node, wherein the logical addressing module is connected to the first node, is configured to pull up a potential of the second node twice during the display period, and pull up the potential of the first node by the second node during a blank period;
the pull-up module connected to the first node and configured to pull up a potential of a stage n stage transmission signal, a first output signal and a second output signal;
a first pull-down module connected to the first node, and configured to pull down the potential of the first node during the blank period;

a second pull-down module connected to the first node and a third node, and configured to pull down the potential of the first node and a potential of the third node respectively during the display period;

a third pull-down module connected to the third node and the second pull-down module, and configured to pull down the potential of the third node during the blank period;

a first pull-down maintenance module including the third node, wherein the first pull-down maintenance module is connected to the first node and the first pull-down module for maintaining the low potential of the first node;

a second pull-down maintenance module connected to the third node and the pull-up module, and configured to maintain the low potential of the stage n stage transmission signal, the first output signal, and the second output signal.

In a display panel of the present disclosure, the first substrate includes a base substrate, a black matrix formed on the base substrate, and a color filter layer formed on the black matrix, and a support pillar formed on the color filter layer and located in a region where the color filter layer overlaps the black matrix, and the color filter layer has a protrusion-depression pattern formed in the contact region contacting the support pillar.

In a display panel of the present disclosure, the black matrix also forms a protrusion-depression pattern in the contact region between the color filter layer and the support pillar.

In a display panel of the present disclosure, the first substrate includes a base substrate, a drive circuit layer formed on the base substrate, and a planarization layer formed on the drive circuit layer; wherein the support pillar is formed on the planarization layer, and the planarization layer has a protrusion-depression pattern in the contact region contacting the support pillar.

In a display panel of the present disclosure, the first substrate includes a base substrate, a drive circuit layer formed on the base substrate, a color resist layer formed on the drive circuit layer, and a planarization layer formed on the color resist layer; wherein the support pillar is formed on the planarization layer, and the planarization layer has a protrusion-depression pattern in the contact region contacting the support pillar.

In a display panel of the present disclosure, the color resist layer also forms a protrusion-depression pattern in the contact region between the planarization layer and the support pillar.

In a display panel of the present disclosure, a shape of the target pattern is a grid.

In a display panel of the present disclosure, a contact area between a drain of the clock input transistor of the pull-up module in the GOA module m1 and an active layer is smaller than that a contact area between a drain of the clock input transistor of the pull-up module in the GOA module m2 and the active layer.

The present disclosure also provides an electronic device including a display panel comprising:

m GOA units arranged in a column direction, wherein each of the GOA units includes a pull-up module, and each of the pull-up modules includes a clock input transistor connected to a clock signal;

n clock signal lines extending in the column direction and arranged in parallel; and m clock signal connection lines extending in a row direction and arranged in parallel, wherein the n clock signal connection lines have one-to-one correspondence to the GOA units, for connecting the clock input transistor of the pull-up module in each of the GOA units to a corresponding one of the clock signal lines;

wherein the clock signal lines include an clock signal line n1 and an clock signal line n2, the clock signal line n2 is formed near a side of the clock signal line n1 away from the GOA units, and a voltage drop value connected to the clock input transistor of the pull-up module in the GOA unit m1 of the clock signal line n1 is greater than a voltage drop value connected to the clock input transistor of the pull-up module in the GOA unit m2 of the clock signal line n2.

In an electronic device of the present disclosure, a size of the clock input transistor of the pull-up module in the GOA unit m1 is larger than a size of the clock input transistor of the pull-up module in the GOA unit m2.

In an electronic device of the present disclosure, each of the clock input transistors includes a plurality of sub-transistors connected in an array, and a number of the sub-transistors of the clock input transistor of the pull-up module in the GOA unit m1 is greater than a number of the sub-transistors of the clock input transistor of the pull-up module in the GOA unit m2.

In an electronic device of the present disclosure, an area of a source of the clock input transistor of the pull-up module in the GOA unit m1 is larger than an area of a source of the clock input transistor of the pull-up module in the GOA unit m2; and/or an area of a drain of the clock input transistor of the pull-up module in the GOA unit m1 is larger than an area of a drain of the clock input transistor of the pull-up module in the GOA unit m2.

In an electronic device of the present disclosure, a contact area between a source of the clock input transistor of the pull-up module in the GOA module m1 and an active layer is smaller than that a contact area between a source of the clock input transistor of the pull-up module in the GOA module m2 and the active layer.

In an electronic device of the present disclosure, the GOA unit n includes:

a pull-up control module connected to a first node, and configured to pull up a potential of the first node during a display period;

a logical addressing module including a second node, wherein the logical addressing module is connected to the first node, is configured to pull up a potential of the second node twice during the display period, and pull up the potential of the first node by the second node during a blank period;

the pull-up module connected to the first node and configured to pull up a potential of a stage n stage transmission signal, a first output signal and a second output signal;

a first pull-down module connected to the first node, and configured to pull down the potential of the first node during the blank period;

a second pull-down module connected to the first node and a third node, and configured to pull down the potential of the first node and a potential of the third node respectively during the display period;

a third pull-down module connected to the third node and the second pull-down module, and configured to pull down the potential of the third node during the blank period;

a first pull-down maintenance module including the third node, wherein the first pull-down maintenance module is connected to the first node and the first pull-down module for maintaining the low potential of the first node;

a second pull-down maintenance module connected to the third node and the pull-up module, and configured to maintain the low potential of the stage n stage transmission signal, the first output signal, and the second output signal.

In an electronic device of the present disclosure, the pull-up control module includes a first transistor and a second transistor; a gate and a first electrode of the first transistor and a gate of the second transistor all are connected to a stage n−2 signal transmission; a second electrode of the first transistor is connected to a first electrode and a fourth node of the second transistor; and a second electrode of the second transistor is connected to the first node.

In an electronic device of the present disclosure, material resistivity of a source drain layer of the clock input transistor of the pull-up module in the GOA unit m1 is greater than material resistivity of a source drain layer of the clock input transistor of the pull-up module in the GOA unit m2.

In an electronic device of the present disclosure, a thickness of a source drain layer of the clock input transistor of the pull-up module in the GOA unit m1 is smaller than a thickness of a source drain layer of the clock input transistor of the pull-up module in the GOA unit m2.

In an electronic device of the present disclosure, a contact area between a source of the clock input transistor of the pull-up module in the GOA module m1 and an active layer is smaller than that a contact area between a source of the clock input transistor of the pull-up module in the GOA module m2 and the active layer.

Beneficial effect of the present disclosure: The present disclosure provides a display panel and an electronic device. The display panel includes a first substrate; a second substrate disposed opposite the first substrate; a support pillar formed on the first substrate; and a liquid crystal filled in a sealed space formed between the first substrate and the second substrate; wherein in a contact region contacting the support pillar, a contact layer of the first substrate contacting the support pillar forms a protrusion-depression pattern, and the protrusion-depression pattern increases a contact area between the contact layer and the support pillar. Based on this structure, the contact area between the support pillar and the bottom layer is increased, and there is no need to change the size of the single sub-pixel, thereby alleviating the technical problem of the existing 8K ultra-high-resolution electronic device that the support pillar easily peels off. Moreover, the clock signal lines include an clock signal line n1 and an clock signal line n2, the clock signal line n2 is formed near a side of the clock signal line n1 away from the GOA units, and a voltage drop value connected to the clock input transistor of the pull-up module in the GOA unit m1 of the clock signal line n1 is greater than a voltage drop value connected to the clock input transistor of the pull-up module in the GOA unit m2 of the clock signal line n2. Based on this circuit structure, by adjusting the voltage drop values of the clock input transistors in different GOA units, the voltage drop values caused by the different lengths of the clock signal lines and the clock signal connection lines are compensated, so that the voltage drop value between each GOA unit and the clock driving chip is approximately the same, thereby alleviating the CK impedance difference existing in the 8K ultra-high resolution electronic device, and improving the technical problem of the difference of the output signal of the GOA units existing in the 8K ultra-high resolution electronic device.

BRIEF DESCRIPTION OF DRAWINGS

In order clearly explain the embodiments or the technical solutions, the drawings required in the description of the embodiments are briefly introduced. Obviously, the drawings in the following description are only used for some embodiments. Those of ordinary skill in the art can obtain other drawings based on these drawings without paying any inventive effort.

DETAILED DESCRIPTION OF PREFERRED EMBODIMENTS

Figure 1:
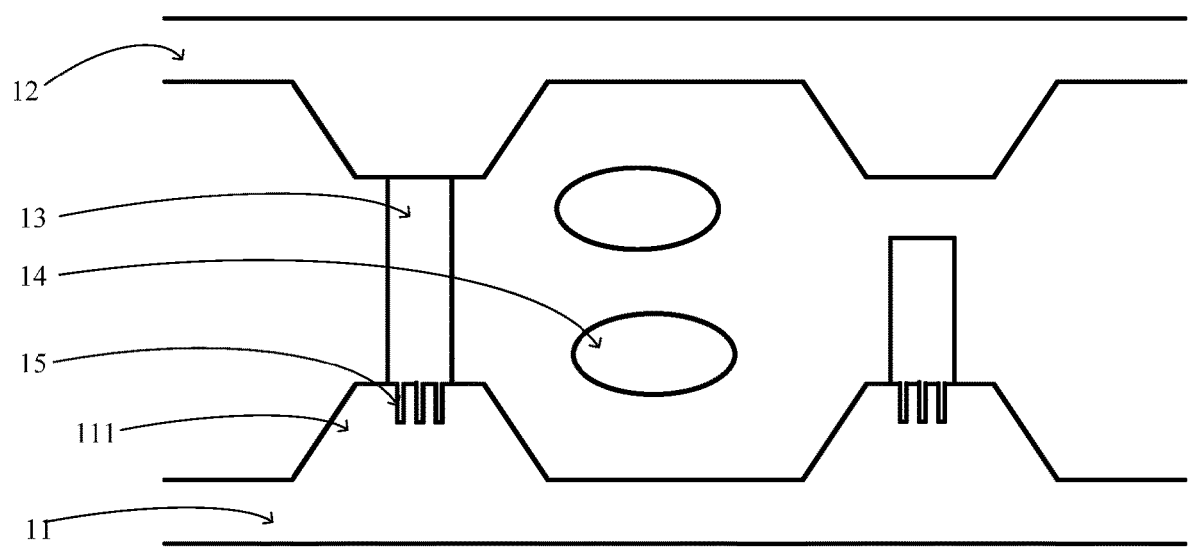
FIG. 1 is a schematic structural diagram of a display panel provided by an embodiment of the present disclosure.

The following description of the embodiments with reference to the accompanying drawings is used to illustrate particular embodiments of the present disclosure. The directional terms referred in the present disclosure, such as "upper", "lower", "front", "back", "left", "right", "inner", "outer", "side surface", etc. are only directions with regard to the accompanying drawings. Therefore, the directional terms used for describing and illustrating the present disclosure are not intended to limit the present disclosure.

The technical solutions in the embodiments of the present disclosure are clearly and completely described as follows with reference to the accompanying drawings in the embodiments. It is apparent that the described embodiments are only a part of the embodiments of the present disclosure, and not all of the embodiments. All other embodiments obtained by a person skilled in the art based on the embodiments of the present disclosure without inventive efforts are within the scope of the present disclosure.

In the description of the present disclosure, it is to be understood that the oriental and the positional relationships of the terms "center", "longitudinal", "transverse", "length", "width", "thickness", "upper", "lower", "front", "rear", "left", "right", "vertical", "horizontal", "top", "bottom", "inside", "outside", "clockwise", "counterclockwise", etc. are based upon the oriental or positional relationship shown in the drawings, are merely for facilitating and simplifying the description of the present disclosure, and do not indicate or imply that the device or components referred to have a specific orientation, and are constructed and operated in a specific orientation. Therefore, it should not be construed as limiting the disclosure. Moreover, the terms "first" and "second" are used for descriptive purposes only and are not to be construed as indicating or implying a relative importance or implicitly indicating the number of indicated technical features. Thus, features defining "first" or "second" may include one or more of the described features either explicitly or implicitly. In the description of the present disclosure, the meaning of "a plurality of" is two or more unless specifically defined otherwise.

In the present disclosure, it is noted that, unless otherwise explicitly set forth and defined, the terms "mount", "contact", and "connect" should be understood broadly, and, for example, may be fixedly connected, detachably connected, integrally connected, mechanically connected, electrically connected, directly connected, or indirectly connected through an intermediate medium, or internally communicated within two components. For those of ordinary skill in the art, the specific meaning of these terms in the present disclosure should be understood on a basis of a specific case situation.

In the present disclosure, unless otherwise expressly stated and defined, the description that "a first feature is on or under a second feature" may mean that the first feature directly contacts the second feature, or mean that the first feature contacts the second feature via another feature therebetween, rather than directly contact the second feature. Moreover, the description that "the first feature is on/above/over the second feature" may mean that the first feature is directly or obliquely on/above/over the second feature, or just mean the horizontal height of the first feature is higher than that of the second feature. The description that "the first feature is under/below/beneath the second feature" may mean that the first feature is directly or obliquely under/below/beneath the second feature, or just mean the horizontal height of the first feature is lower than that of the second feature.

The following description provides a number of different embodiments or examples for implementing the different structures of the present disclosure. In order to simplify the present disclosure, components and arrangements of specific examples are described below. Certainly, the examples are merely exemplary and are not intended to limit the present disclosure. In addition, for the sake of simplicity and clarity, the reference numerals and/or the reference letters may repeat in different examples in the present disclosure, which does not indicate the relationship between the various discussed embodiments and/or arrangements. Moreover, the examples of various specific processes and materials are provided in the present disclosure, but a person of ordinary skill in the art will appreciate the application of other processes and/or the use of other materials.

The present disclosure provides a display panel and an electronic device to alleviate the technical problem of an existing 8K ultra-high-resolution electronic device that support pillar easily peels off.

In one embodiment, a projection-depression pattern includes a target pattern formed by a contact layer through at least one of protrusions, depressions, or a combination of protrusions and depressions. For example, a contact layer forms a target pattern through depressions in the following embodiments. In other embodiments, the contact layer may form the target pattern only by at least one of a protrusion manner or a combination manner of protrusions and depressions. The combination manner of protrusions and depressions means that the contact layer forms a part of the target pattern through the protrusions and forms other parts of the target pattern through the depressions. The specific implementation methods of these manners are similar to the target pattern formed by the depressions of the contact layer described in the following embodiments.

As shown in FIG. 1, the present disclosure provides a display panel including:
a first substrate 11;
a second substrate 12 disposed opposite the first substrate 11;
a support pillar 13 formed on the first substrate 11; and
a liquid crystal 14 filled in a sealed space formed between the first substrate 11 and the second substrate 12;
wherein in a contact region contacting the support pillar 13, a contact layer 111 (that is, the bottom layer described above) of the first substrate 11 contacting the support pillar 13 forms a protrusion-depression pattern 15, and the protrusion-depression pattern increases a contact area between the contact layer 111 and the support pillar 13.

The display panel provided by the present embodiment includes a first substrate; a second substrate disposed opposite the first substrate; a support pillar formed on the first substrate; and a liquid crystal filled in a sealed space formed between the first substrate and the second substrate; wherein in a contact region contacting the support pillar, a contact layer of the first substrate contacting the support pillar forms a protrusion-depression pattern, and the protrusion-depression pattern increases a contact area between the contact layer and the support pillar. Based on this structure, the contact area of the support pillar and the bottom layer is increased, and there is no need to change the size of the single sub-pixel, thereby alleviating the technical problem of the existing 8K ultra-high-resolution electronic device that the support pillar easily peels off.

Figure 2:
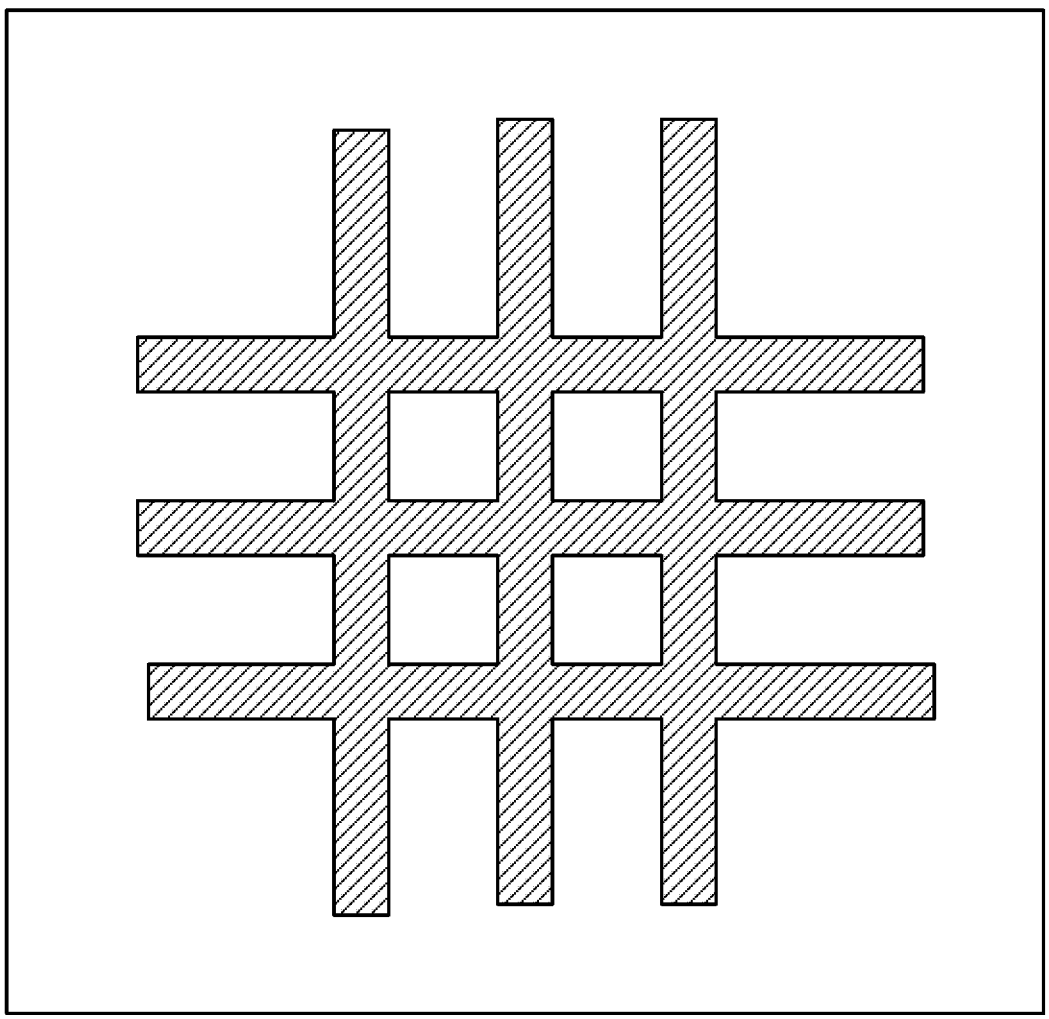
FIG. 2 is a schematic design diagram of a target pattern provided by an embodiment of the present disclosure.

In an embodiment, as shown in FIG. 2, the shape of the protrusion-depression pattern 15 provided in the embodiment of the present disclosure corresponds to the target pattern in a grid shape. In some embodiments, the grid size ranges from 1 to 6 μm, the interval ranges from 1 to 6 μm, and the depth is less than 0.5 μm. Performing photolithography on the contact layer (usually an organic material layer) with a photomask can realize this embodiment. For example, by changing the grid design of the RGB/PFA photomask here for the arrangement region of the protrusion-depression pattern, and using the photomask with a transmittance of 80% to 90%, the transmittance is reduced, and part of the photoresist is removed by the developer, thereby meeting the requirement of reducing the layer thickness by 0.5 μm to form the protrusion-depression pattern.

Figure 3A:
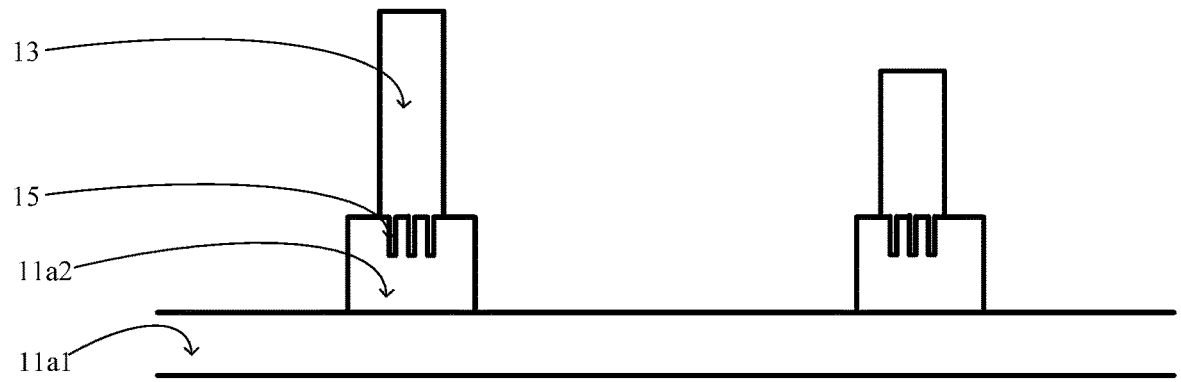
FIG. 3A to FIG. 3G are schematic design diagrams of display panels provided by embodiments of the present disclosure.

In one embodiment, the display panel as shown in FIG. 1 has a color filter on array (COA, RGB on an array substrate) structure. As shown in FIG. 3A, the first substrate 11 includes a base substrate 11a1 and a black matrix 11a2 formed on the base substrate. The black matrix 11a2 is arranged around an array and an opening corresponding to a sub-pixel light emitting region. The support pillars 13 are formed on the black matrix 11a2. That is, the black matrix 11a2 is the above-mentioned contact layer 111. The black matrix 11a2 forms the protrusion-depression patterns 15 in the contact regions contacting the support pillars 13.

Figure 3B:
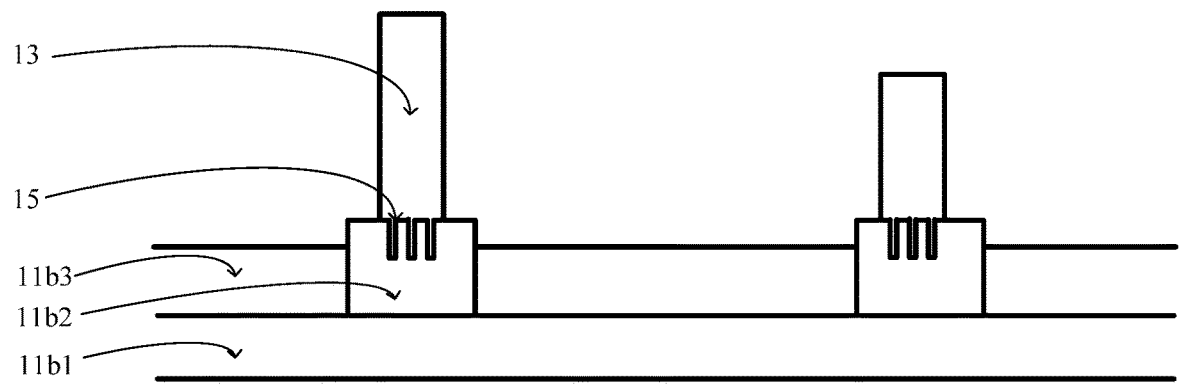

In one embodiment, the display panel as shown in FIG. 1 has a non-color filter on array (COA, RGB on an array substrate) structure. As shown in FIG. 3B, the first substrate 11 includes a base substrate 11b1 and a black matrix 11b2 formed on the base substrate. The black matrix 11b2 is arranged around an array and a color filter layer 11b3 corresponding to a sub-pixel light emitting region. The support pillars 13 are formed on the black matrix 11a2. That is, the black matrix 11b2 is the above-mentioned contact layer 111. The black matrix 11b2 forms the protrusion-depression patterns 15 in the contact regions contacting the support pillars 13.

Figure 3C:
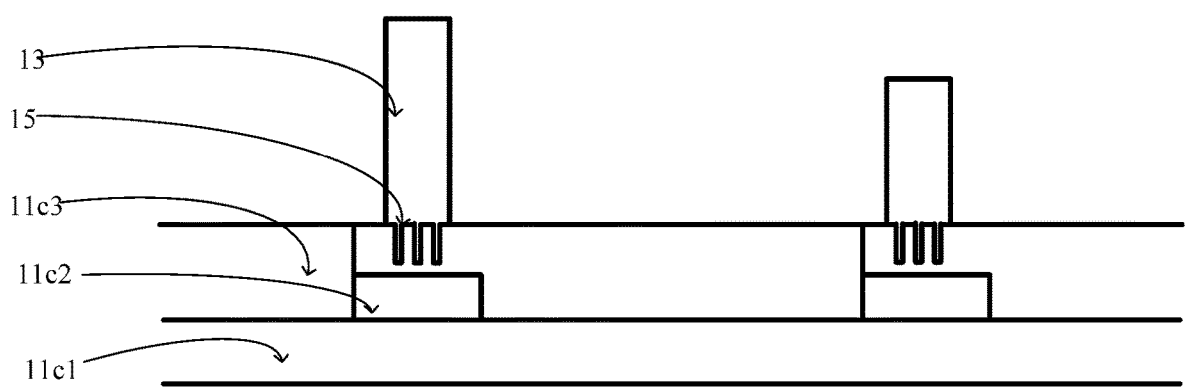

In one embodiment, the display panel as shown in FIG. 1 has a non-color filter on array (COA, RGB on an array substrate) structure, wherein the color filter layer covers the black matrix. As shown in FIG. 3C, the first substrate 11 includes a base substrate 11c1, a black matrix 11c2 formed on the base substrate, and a color filter layer 11c3 formed on the black matrix 11c2. The support pillars 13 are formed on the color filter layer 11c3 in a region where the color filter layer 11c3 overlaps the black matrix 11c2. That is, the color filter layer 11c3 is the above-mentioned contact layer 111. The color filter layer 11c3 forms the protrusion-depression patterns 15 in the contact regions contacting the support pillars 13.

Figure 3D:
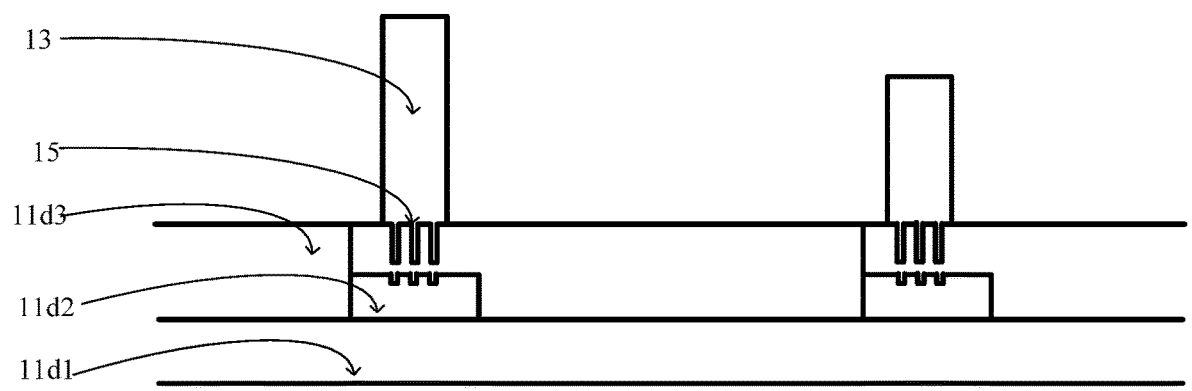

In one embodiment, the display panel as shown in FIG. 1 has a non-color filter on array (COA, RGB on an array substrate) structure, wherein the color filter layer covers the black matrix. As shown in FIG. 3D, the first substrate 11 includes a base substrate 11d1, a black matrix 11d2 formed on the base substrate, and a color filter layer 11d3 formed on the black matrix 11d2. The support pillars 13 are formed on the color filter layer 11d3 in a region where the color filter layer 11d3 overlaps the black matrix 11d2. That is, the color filter layer 11d3 is the above-mentioned contact layer 111. The color filter layer 11d3 forms the protrusion-depression patterns 15 in the contact regions contacting the support pillars 13. The black matrix 11d2 forms the protrusion-depression patterns 15 in the contact regions wherein the color filter layer 11d3 contacts the support pillars 13.

Figure 3E:
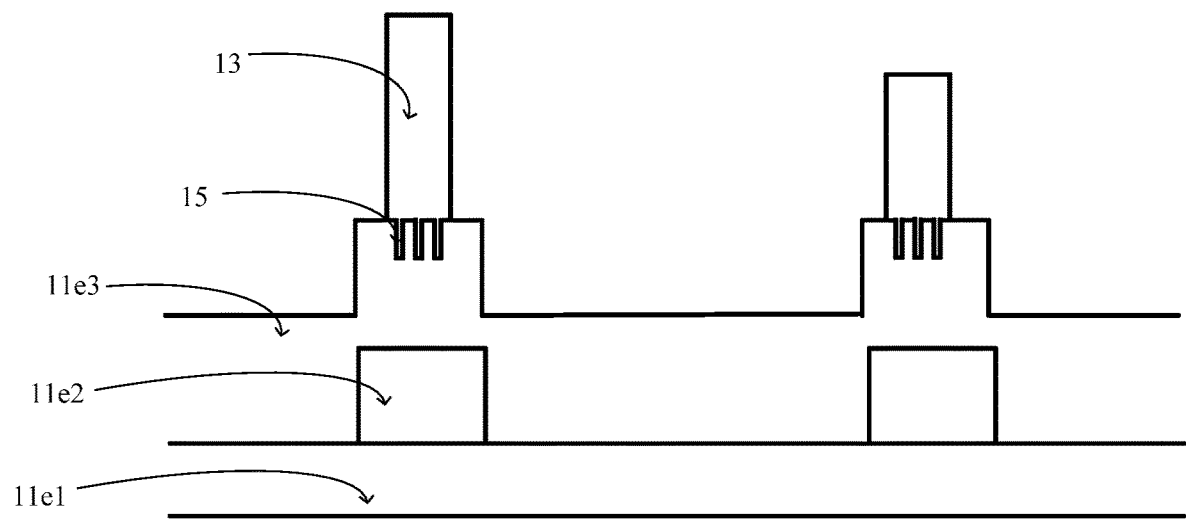

In one embodiment, the display panel as shown in FIG. 1 has a non-color filter on array (COA, RGB on an array substrate) structure, which is also a PS on array (POA, PS on an array substrate) structure. As shown in FIG. 3E, the first substrate 11 includes a base substrate 11e1, a drive circuit layer 11e2 formed on the base substrate, and a planarization layer 11e3 formed on the drive circuit layer 11e2. The support pillars 13 are formed on the planarization layer 11e3. That is, the planarization layer 11e3 is the above-mentioned contact layer 111. The planarization layer 11e3 forms the protrusion-depression patterns 15 in the contact regions contacting the support pillars 13.

Figure 3F:
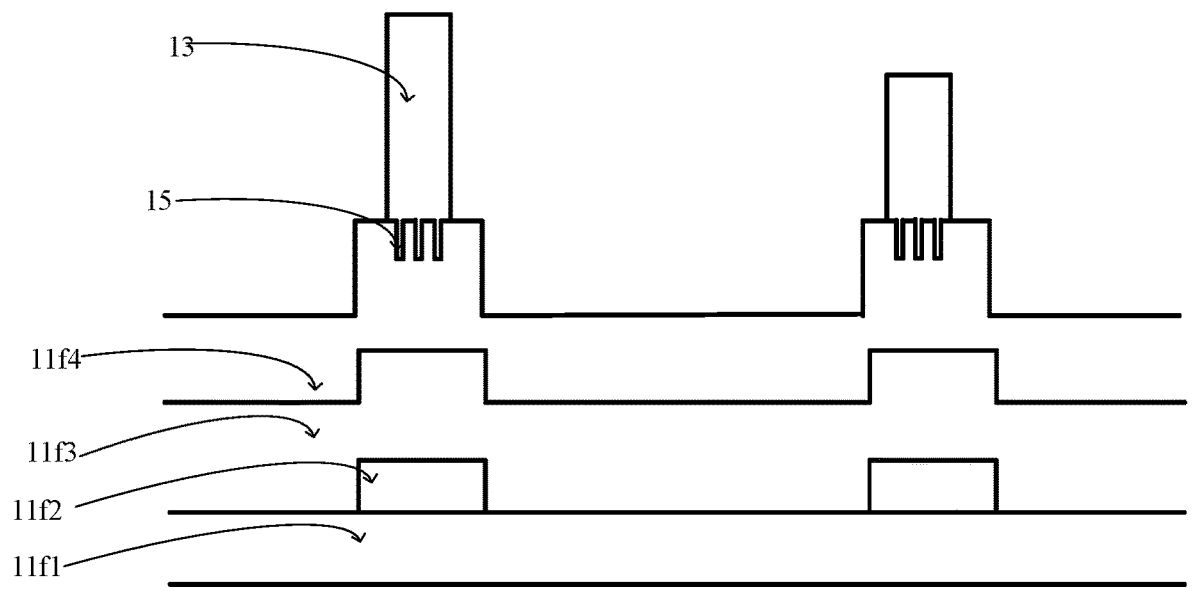

In one embodiment, the display panel as shown in FIG. 1 has a color filter on array (COA, RGB on an array substrate) structure, which is also a PS on array (POA, PS on an array substrate) structure. As shown in FIG. 3F, the first substrate 11 includes a base substrate 11f1, a drive circuit layer 11f2 formed on the base substrate, a color filter layer 11f3 formed on the drive circuit layer 11f2, and a planarization layer 11f4 formed on the color filter layer 11f3. The support pillars 13 are formed on the planarization layer 11f4. That is, the planarization layer 11f4 is the above-mentioned contact layer 111. The planarization layer 11f4 forms the protrusion-depression patterns 15 in the contact regions contacting the support pillars 13.

Figure 3G:
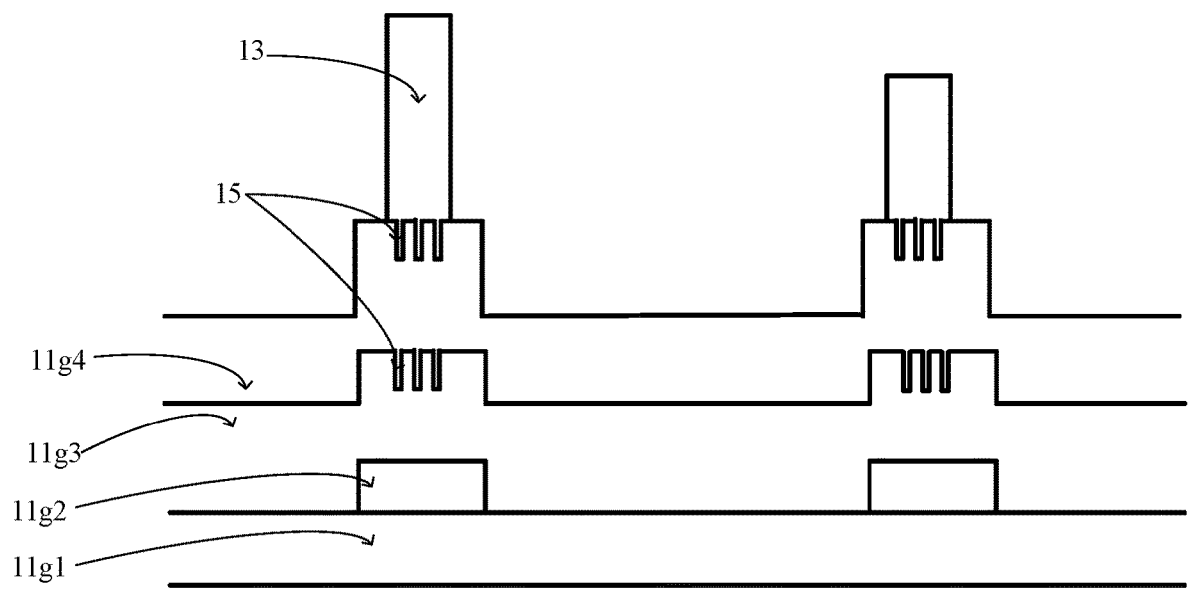

In one embodiment, the display panel as shown in FIG. 1 has a color filter on array (COA, RGB on an array substrate) structure, which is also a PS on array (POA, PS on an array substrate) structure. As shown in FIG. 3G, the first substrate 11 includes a base substrate 11g1, a drive circuit layer 11g2 formed on the base substrate, a color filter layer 11g3 formed on the drive circuit layer 11g2, and a planarization layer 11f4 formed on the color filter layer 11g3. The support pillars 13 are formed on the planarization layer 11g4. That is, the planarization layer 11g4 is the above-mentioned contact layer 111. The planarization layer 11g4 forms the protrusion-depression patterns 15 in the contact regions contacting the support pillars 13. The color filter layer 11g3 forms the protrusion-depression patterns 15 in the contact regions contacting the support pillars 13.

In one embodiment, material of the planarization layer is PFA (macromolecule organic transparent material), a thickness of the planarization layer is about 1.5 μm, and a thickness of the black matrix, the color filter layer, and the color resist layer ranges from 2 to 3 μm. Then, based on the thicknesses, after the protrusion-depression pattern 15 is formed, the original function of the layers are not affected.

In one embodiment, the support pillars include main support pillars and sub-support pillars. In the regions of the main support pillars and the sub-support pillars, the contact layer may form the protrusion-depression patterns 15 with the same parameters (including sizes, shapes and depths, etc.) with different parameters (including sizes, shapes, depths, etc.). For example, the depth of the protrusion-depression pattern 15 formed by the contact layer at the main support pillars is greater than the depth of the protrusion-depression pattern 15 formed by the contact layer at the sub-support pillars.

For the 8K ultra-high resolution display panel, at least the following technical problems still exist even when the technical problem that the support pillars of the 8K electronic device easily peels off is resolved:

The area of a single sub-pixel of an 8K resolution electronic device is one-quarter of the area of a single sub-pixel of a 4 K resolution electronic device, accompanied by difficulty in preparing the corresponding photomask and increased costs. In the actual product manufacturing process, for display panels with the same resolution but different sizes, due to different areas of individual sub-pixels, photomasks with different sizes need to be developed and prepared. For example, in the conventional technology, in the manufacturing processes of 65-inch 8K resolution display panels and 85-inch 8K resolution display panels, photomasks with different sizes are required, and development costs are high. The sizes of the photomasks refer to the sizes of light-shielding regions on the photomasks. That is, the existing 8K electronic devices have the technical problem that preparing the photomasks with the different sizes is required for the display panels with the different sizes.

Sub-pixels of each pixel in the LCD panel are arranged in rows. In this disclosure, the arrangement direction of the sub-pixels is a row direction, and a direction being perpendicular to the row direction is a column direction. A row width value refers to a width value of a certain region in the row direction.

In this disclosure, a repeating region refers to a region on the photomask. The photomask is composed of repeating regions distributed in an array. A pixel region refers to a region corresponding to a smallest light emitting unit (i.e., sub-pixel) in the display panel. The pixel region includes a light-transmitting region and a light-shielding region surrounding the light-transmitting region. In the process of preparing the display panel, aligning the photomask to the substrate is aligning the repeating regions of the photomask to the pixel regions of the substrate.

Figure 4:
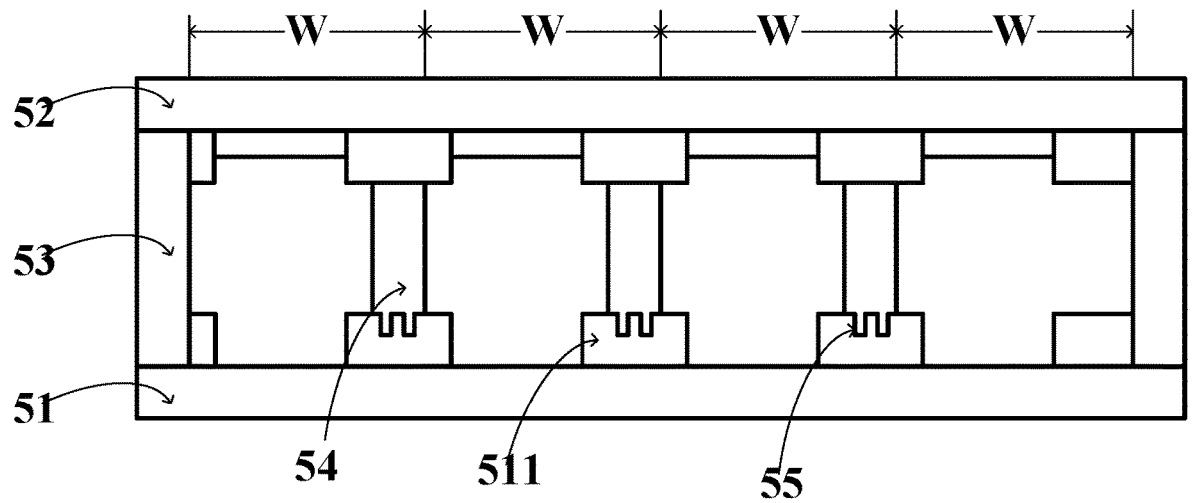
FIG. 4 is another schematic structural diagram of a display panel provided by an embodiment of the present disclosure.

In order to solve these technical problems, in an embodiment, as shown in FIG. 4, the display panel provided by the embodiment of the present disclosure includes:

an array substrate 51 forming a driving circuit layer and pixel electrodes;

a color filter substrate 52 disposed opposite the array substrate 51;

a sealant frame 53 configured to encapsulate the array substrate 51 and the color filter substrate 52 and forming a sealed space filled with liquid crystals;

a support pillar 54 formed on the array substrate 51 or the color filter substrate for supporting the array substrate 51 and the color filter substrate 52.

Figure 5A:
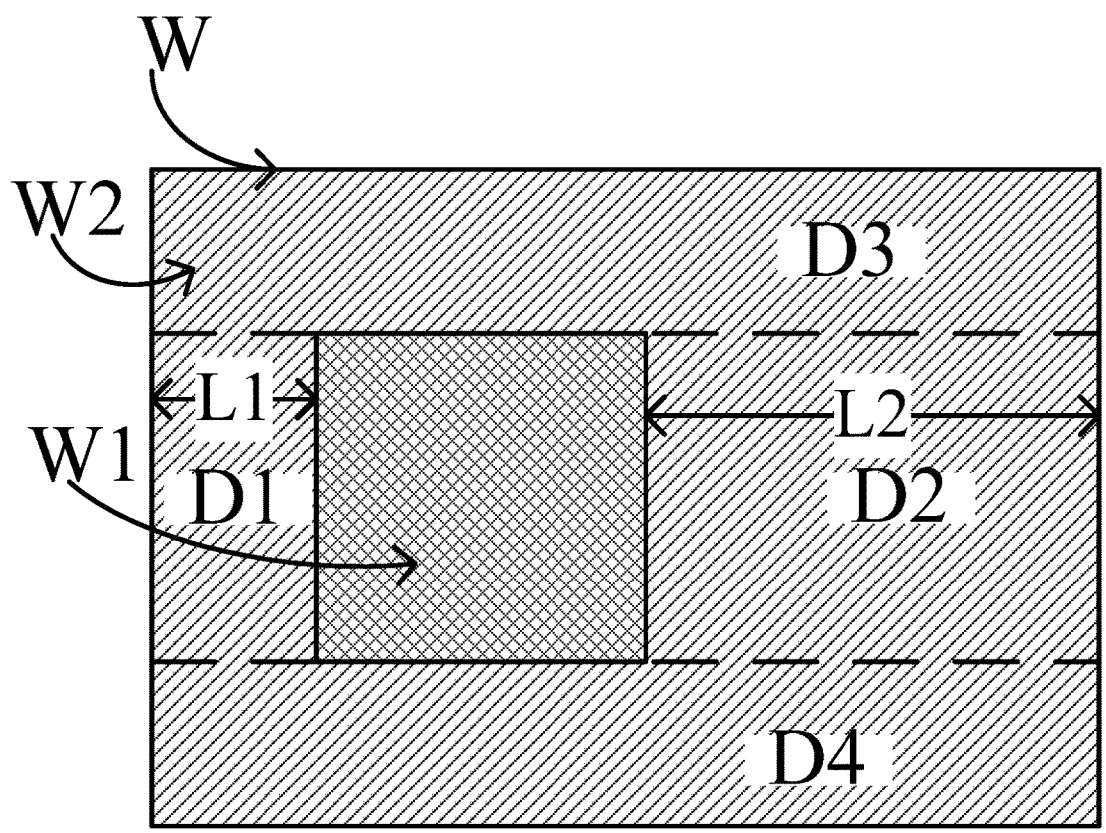
FIG. 5A to FIG. 5E are schematic diagrams of a color filter substrate and a corresponding mask provided by embodiments of the present disclosure.
Figure 5B:
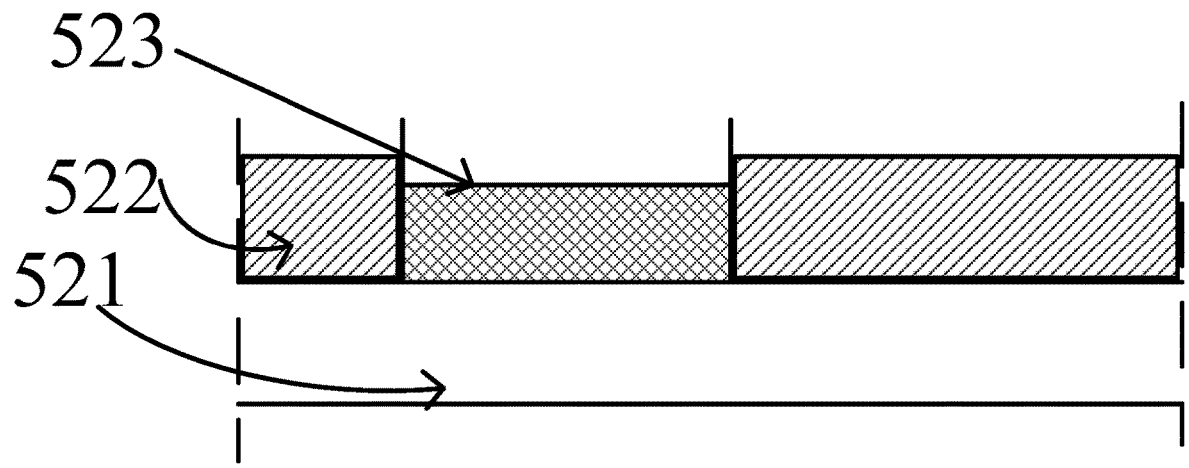
Figure 5C:
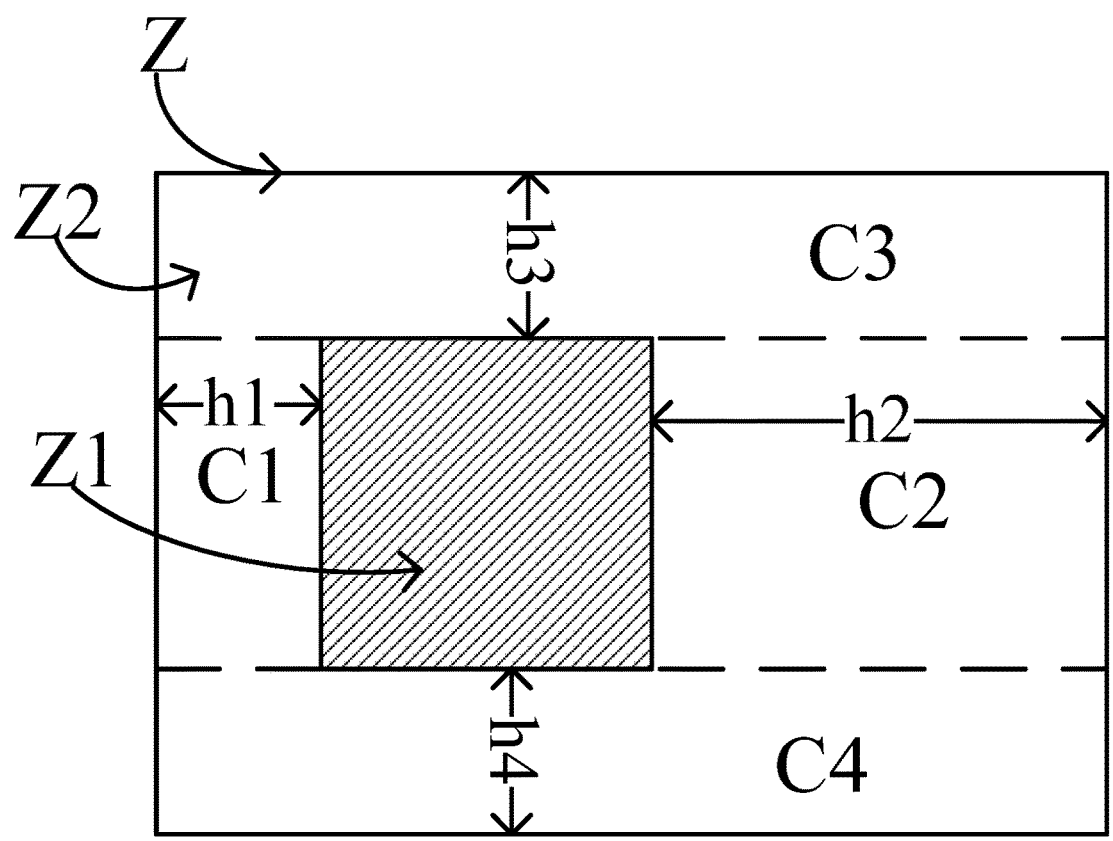
Figure 5D:
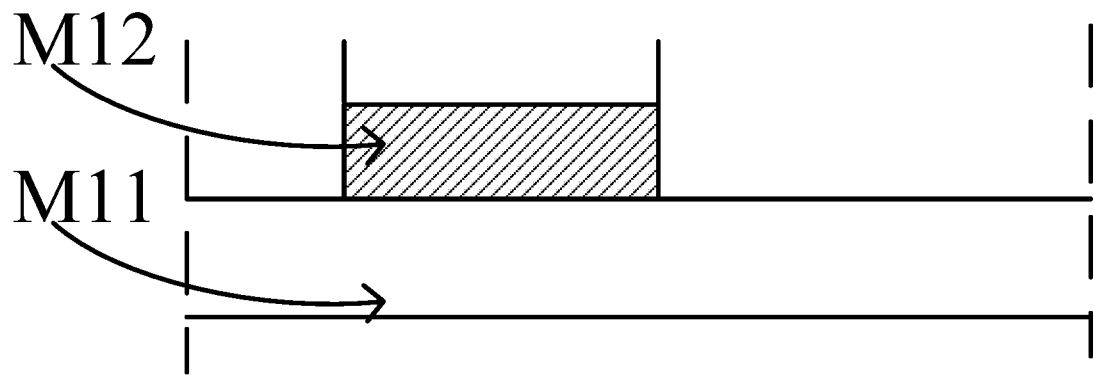
Figure 5E:
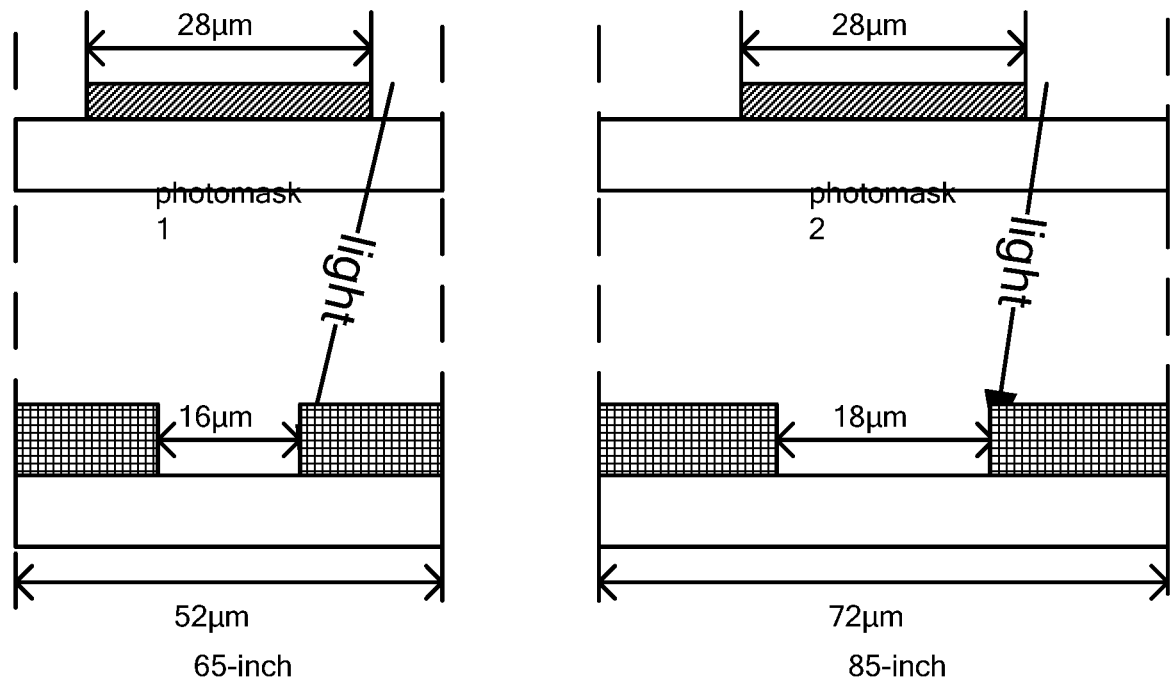

In one embodiment, the technical problem of preparing the photomasks with the different sizes for the display panels with different sizes is shown in FIG. 5E. FIG. 5E is a schematic diagram of the effect of an existing photomask. The light shielding region of the photomask is arranged in the middle of the pixel region, as shown in FIG. 5E. The row width value of a single sub-pixel in a 65-inch 8K resolution display panel is 52 μm. The row width value of the pixel region of the photomask 1 corresponding to the 65-inch 8K resolution display panel is also 52 μm. The row width value of a single sub-pixel in a 85-inch 8K resolution display panel is 72 μm. The row width value of the pixel region of the photomask 2 corresponding to the 85-inch 8K resolution display panel is also 72 μm. If the photomasks with the same sizes are used, and, that is, the row width value of the light shielding region is 28 μm, in the row direction, the single light-transmitting region of the mask 1 has a row width of 12 μm, and the single light-transmitting region of the mask 2 has a row width of 22 μm. During photolithography, the light-transmitting regions forms slits, and light diffracts through the slits. According to the principle of light diffraction, the smaller the slits are, the larger the diffraction range of light is.

The black matrix is a negative photoresist, and regions not exposed to light are etched to form openings. Then, as shown in FIG. 5E, the row width value of the actual effective light-shielding range of the light-shielding region of the photomask 1 is 16 μm (that is, the diffraction range of a single slit is 6 μm). The row width value of the light transmission region of a single sub-pixel of the formed 65-inch 8K resolution display panel is 16 μm. The row width value of the actual effective shading range of the light-shielding region of the photomask 2 is 18 μm (that is, the diffraction range of a single slit is 5 μm). The row width value of the light transmission region of a single sub-pixel of the formed 85-inch 8K resolution display panel is 18 μm. All of these are also in line with the principle of light diffraction. However, this causes the row width of the light transmission region of a single sub-pixel of the 65-inch 8K resolution display panel to be different from the row width of the light transmission region of a single sub-pixel of the 85-inch 8K resolution display panel, and then, when the RGB color filter layer is being formed, the photomasks with different sizes need to be used. Therefore, the existing 8K electronic devices have at least the technical problem it is required to prepare the photomasks with different sizes for the display panels with different sizes, and the technical problem needs to be improved. Then, this disclosure provides a photomask, a display panel, and an electronic device, which can solve the technical problem that it is required to prepare the photomasks with different sizes for the display panels with different sizes in at least the existing 8K electronic devices.

In order to solve these problems, as shown in FIG. 5A to FIG. 5*b*, the color filter substrate includes:

abase substrate 521;

a black matrix 522 formed on the base substrate, and including an opening into which a color filter layer 523 is filled; and the color filter layer 523 formed in the opening.

As shown in FIG. 5A and FIG. 5B, the color filter substrate includes a plurality of pixel regions W arranged in an array and corresponding to sub-pixels. The pixel regions W include first regions W1 corresponding to the openings, and second regions W2 surrounding the first regions W1. The black matrix 522 is formed in the second regions W2. The second region W2 includes a first side region D1 and a second side region D2 arranged in the row direction and in parallel, and a third side region D3 and a fourth side region D4 arranged in the column direction and in parallel. A first distance L1 from a side of the first side region D1 away from the opening to the opening is less than a second distance L2 from a side of the second side region D2 away from the opening to the opening.

In one embodiment, a driving circuit is formed in a range of the third side region D3, and the protrusion-depression pattern is formed in a range of the third side region D3. For example, the protrusion-depression pattern is formed in the third side region D3.

Based on this structure, the photomasks with the same size can be used in the display panels with the same resolution and different size. The difference between these photomasks is only the distance between the opening pattern and the edge of the pixel region, which solves the technical problem that it is required to prepare the photomasks with different sizes for the display panels with different sizes in at least the existing 8K electronic devices, and reduces the costs of product production.

In one embodiment, in the 85-inch or more than 85-inch 8K resolution display panel, in the row direction, a value of the first distance L1 is less than 18 μm, and a value of the second distance L2 is greater than 18 μm.

In one embodiment, in the 85-inch 8K resolution display panel, in the row direction, a width of the opening is 16 μm, and the sum of the first distance L1 and the second distance L2 is 56 μm.

In order to prepare the color filter substrate as shown in FIG. 5A to FIG. 5B, the present disclosure also provides the photomask as shown in FIG. 5C to FIG. 5D. As shown in FIG. 5C to 5D, the photomask provided by the present disclosure includes:

a photomask substrate M11;

an opening pattern M12 formed on the photomask substrate M11, which is used to form the black matrix or the color filter layer of the color filter substrate, and the black matrix includes the openings into which the color filter layer is filled;

wherein the photomask includes a plurality of repeating regions Z, and the repeating regions Z include first regions Z1 corresponding to the opening patterns M12 and second regions Z2 surrounding the first regions Z1. The second region Z2 includes a first side region C1 and a second side region C2 arranged in the row direction and in parallel, and a third side region C3 and a fourth side region C4 arranged in the column direction and in parallel. A third distance h1 from a side of the first side region C1 away from the opening pattern M12 to the opening pattern M12 is less than a fourth distance h2 from a side of the second side region C2 away from the opening pattern M12 to the opening pattern M12.

The photomask does not employ the existing photomask opening pattern, such as the light-shielding region located in the center of the repeating regions, and moves the light-shielding region to the side, so that the black matrix opening or color filter layer with a desired size can be obtained based on the diffraction effect. The size of the opening pattern need not be changed. Based on this structure, the photomask with the same sizes can be used in the display panel with the same resolution and different sizes. The difference between these masks is only the distance between the opening pattern and the edge of the pixel region, which solves the technical problem that it is required to prepare the photomasks with different sizes for the display panels with different sizes in at least the existing 8K electronic devices, and reduces the costs of product production.

In one embodiment, a light-shielding pattern corresponding to the target pattern of the protrusion-depression pattern is formed in the third side region C3 of the photomask. The light transmittance of the light-shielding pattern ranges from 80% to 90%, so as to form a depressed target pattern in the corresponding region of the black matrix as the protrusion-depression pattern.

In one embodiment, a fifth distance h3 from a side of the third side region C3 away from the opening pattern M12 to the opening pattern M12 is equal to a sixth distance h4 from a side of the fourth side region C4 away from the opening pattern M12 to the opening pattern M12.

In one embodiment, when the photomask is used to prepare an 85-inch or more than 85-inch 8K resolution display panel, a value of the third distance h1 is less than 12 µm, and a value of the fourth distance h2 is greater than 32 µm.

In one embodiment, when the photomask is used to prepare an 85-inch or more than 85-inch 8K resolution display panel, a value of the third distance h1 is less than 10 µm, and a value of the fourth distance h2 is greater than 34 µm.

In one embodiment, when the photomask is used to prepare an 65-inch or more than 65-inch 8K resolution display panel, a width value of the opening pattern M12 in the row direction is 28 µm.

In one embodiment, when the photomask is used to prepare an 85-inch 8K resolution display panel, in the photomask of the present disclosure, a sum of the third distance h1 and the fourth distance h2 is 44 µm.

In one embodiment, the opening pattern M12 is formed by patterning a material with a light transmittance of 0, and the material includes metallic chromium and the like.

In one embodiment, a straight line with a light transmittance of 0 is formed between adjacent repeating regions Z to ensure the slit effect. A width of the straight line is less than 1 µm, which does not affect the pattern of the black matrix below the region.

In one embodiment, in order to obtain the color filter substrate in the embodiments as shown in FIGS. 5A and 5B, the embodiments of the present disclosure further provide the following preparation method of the color filter substrate, which includes:

Step 1 of provide a base substrate.

Figure 9A:
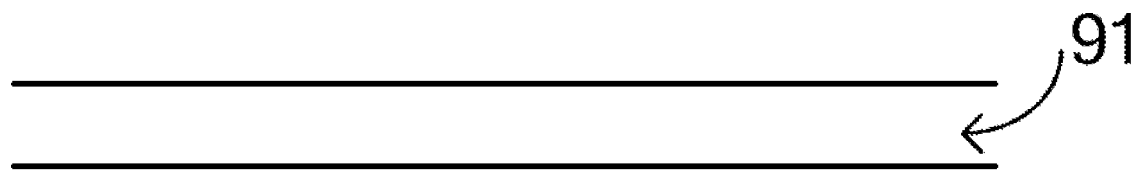
FIG. 9A to FIG. 9O are schematic diagrams of preparation of a display panel provided by an embodiment of the present disclosure.

As shown in FIG. 9A, a transparent glass substrate or the like is provided as the base substrate 91.

Step 2 of forming a black matrix material layer on the base substrate.

Figure 9B:
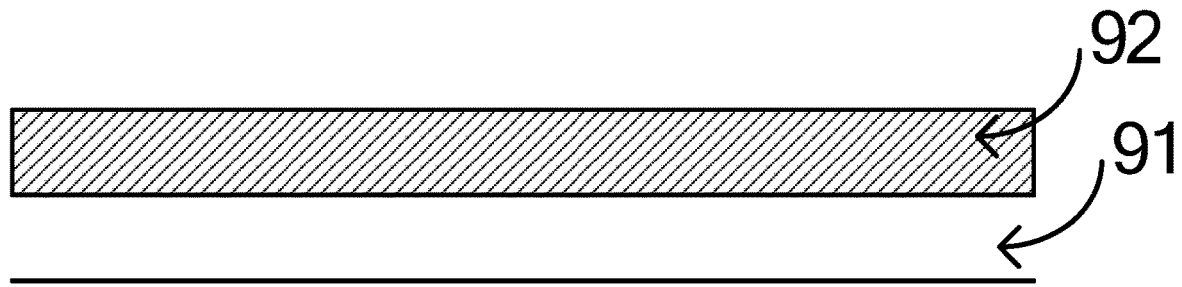

As shown in FIG. 9B, the black matrix material layer 92 is formed on the base substrate 91, such as a transparent glass substrate, wherein material of the black matrix material layer is negative photoresist, and the regions shielded by the photomask are removed.

Step 3 of aligning a first photomask plate with the base substrate.

Figure 9C:
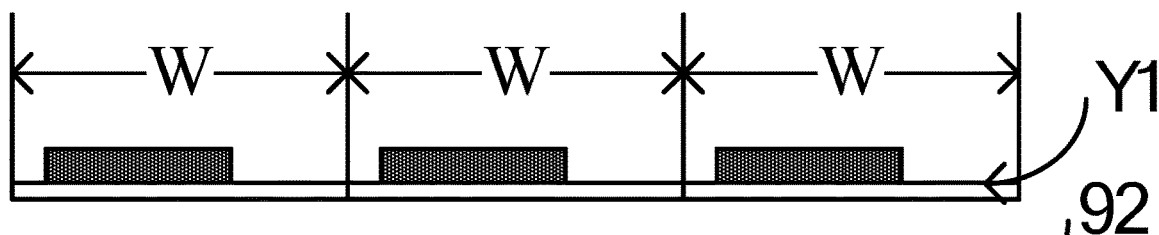

As shown in FIG. 9C, the first photomask Y1 is used, and each repeating region Z of the first photomask Y1 corresponding to the pixel region W adopts the design of the embodiment as shown in FIG. 5C and FIG. 5D. The first photomask Y1 is aligned with the base substrate obtained in step 2.

Step 4 of patterning the black matrix material to form a black matrix.

Figure 9D:
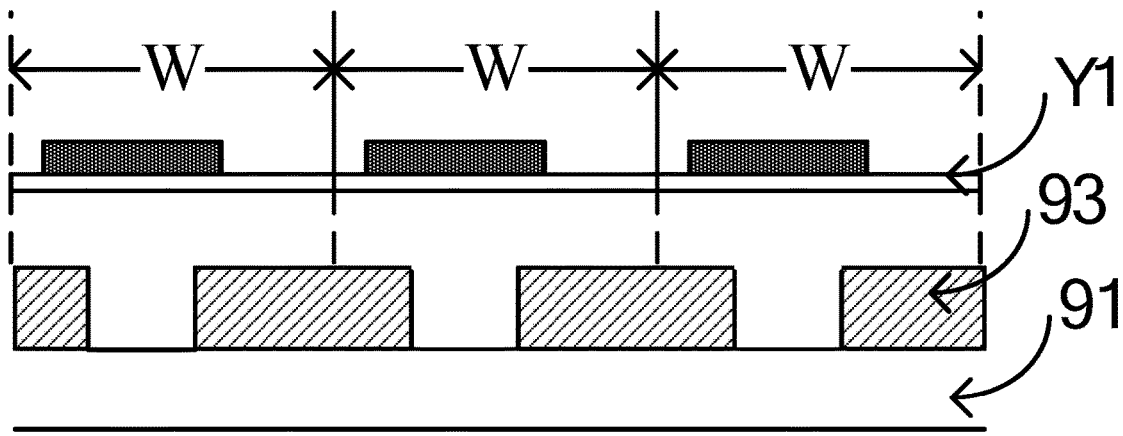

As shown in FIG. 9D, by using a device, such as an exposure machine, to perform a photolithography process on the black matrix material layer 92 based on the first photomask, a black matrix 93 is obtained.

Step 5 of coating a red color resist material layer.

Figure 9E:
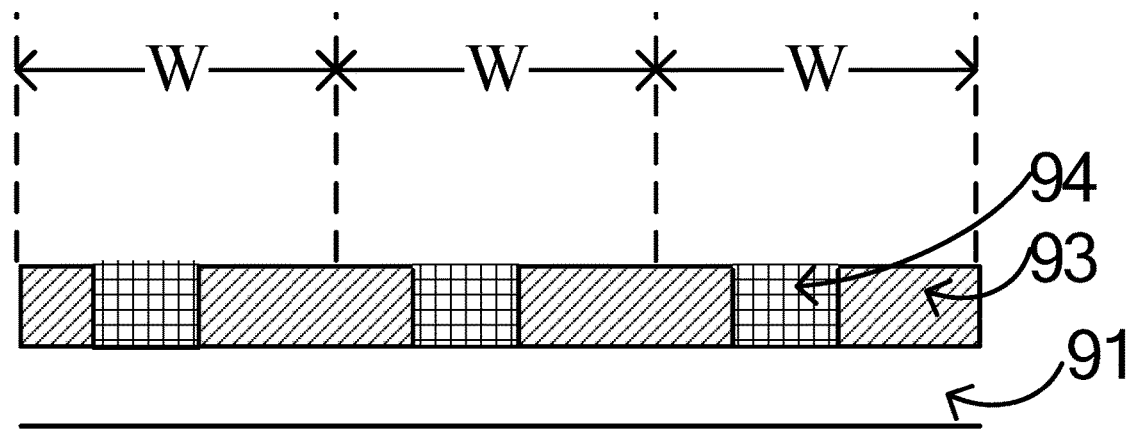

As shown in FIG. 9E, a red photoresist layer 94 is coated on the entire surface of the base substrate obtained in step 4, wherein material of the red photoresist layer is a positive photoresist, and the regions shielded by the photomask remain.

Step 6 of aligning the second photomask with the base substrate.

Figure 9F:
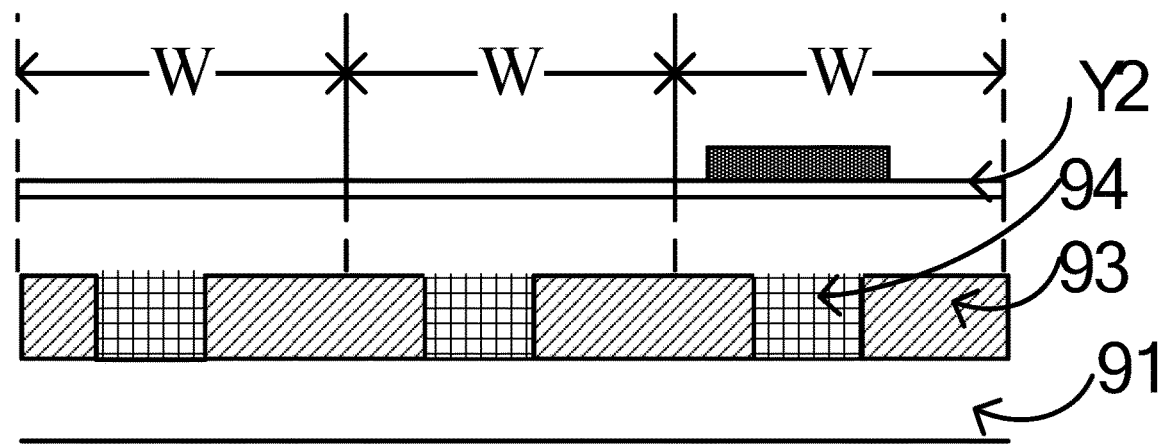

As shown in FIG. 9F, the second photomask Y2 is used, and each repeating region Z of the second photomask Y2 only corresponding to the pixel region W to which red sub-pixels correspond adopts the design of the embodiment as shown in FIG. 5C and FIG. 5D. The second photomask Y2 is aligned with the base substrate obtained in step 5.

Step 7 of patterning the red photoresist layer.

Figure 9G:
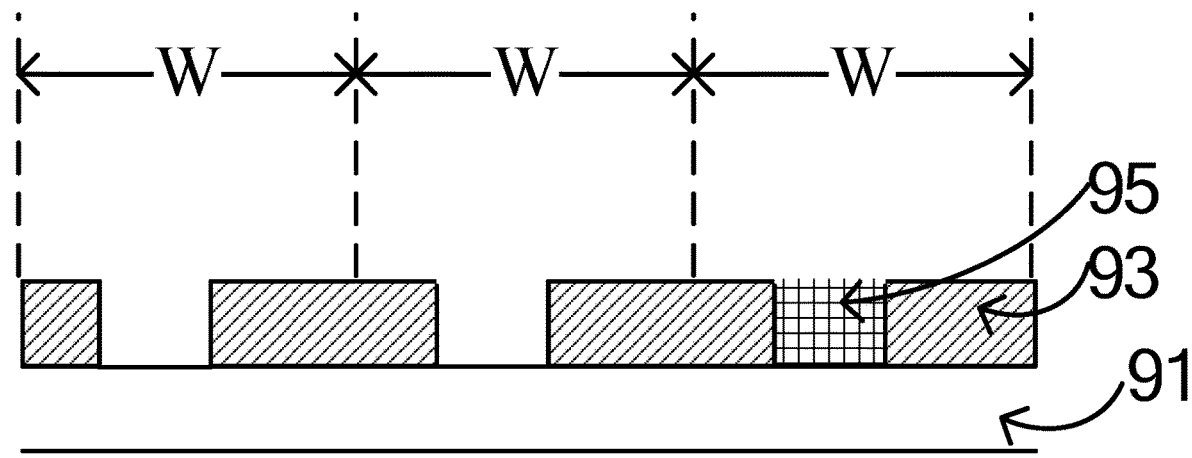

As shown in FIG. 9G, by using a device, such as an exposure machine, to perform a photolithography process on a red photoresist layer 94 based on the second photomask, the red filter layer 95 is obtained.

Step 8 of coating a green color resist material layer.

Figure 9H:
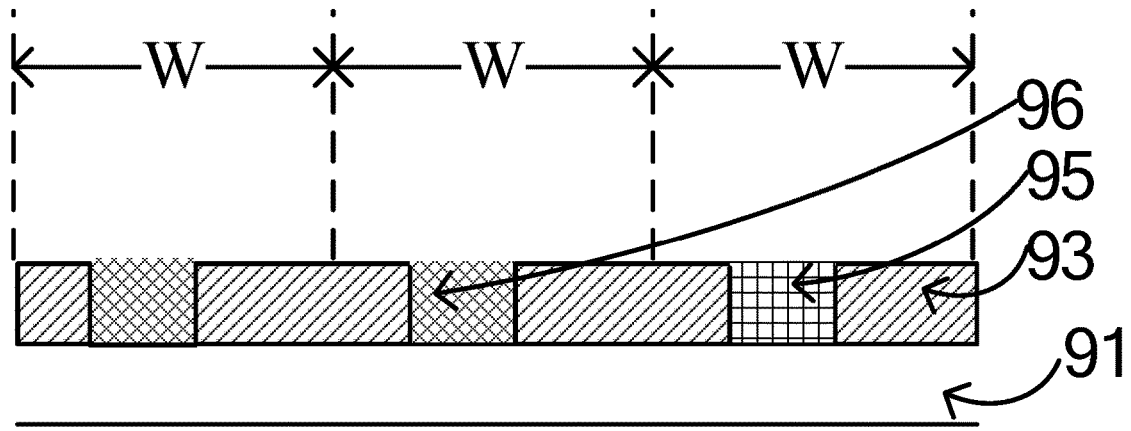

As shown in FIG. 9H, a green photoresist layer 96 is coated on the entire surface of the base substrate obtained in step 7, wherein material of the green photoresist layer is a positive photoresist, and the regions shielded by the photomask remain.

Step 9 of aligning the third photomask with the base substrate.

Figure 9I:
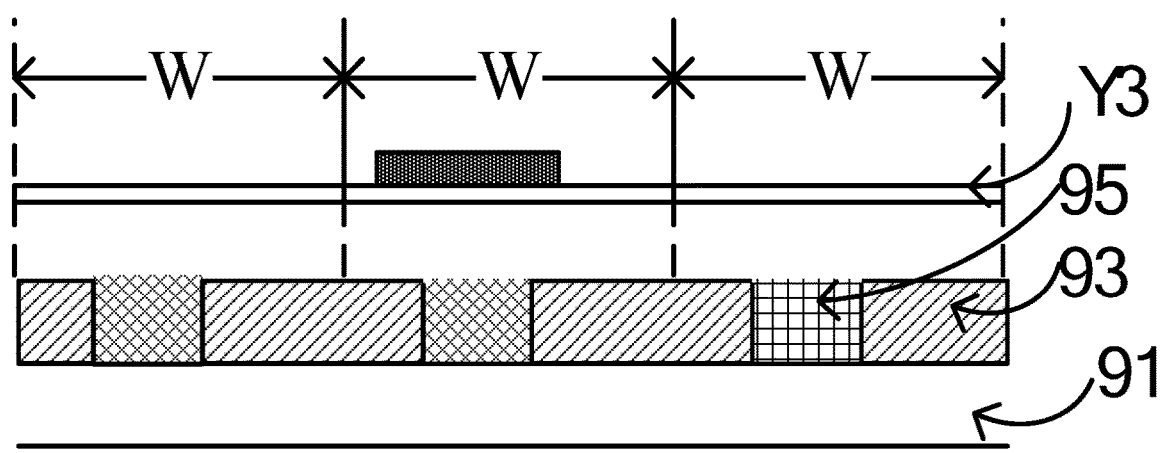

As shown in FIG. 9I, the third photomask Y3 is used, and each repeating region Z of the third photomask Y3 only corresponding to the pixel region W to which green sub-pixels correspond adopts the design of the embodiment as shown in FIG. 5C and FIG. 5D. The third photomask Y3 is aligned with the base substrate obtained in step 8.

Step 10 of patterning the green photoresist layer.

Figure 9J:
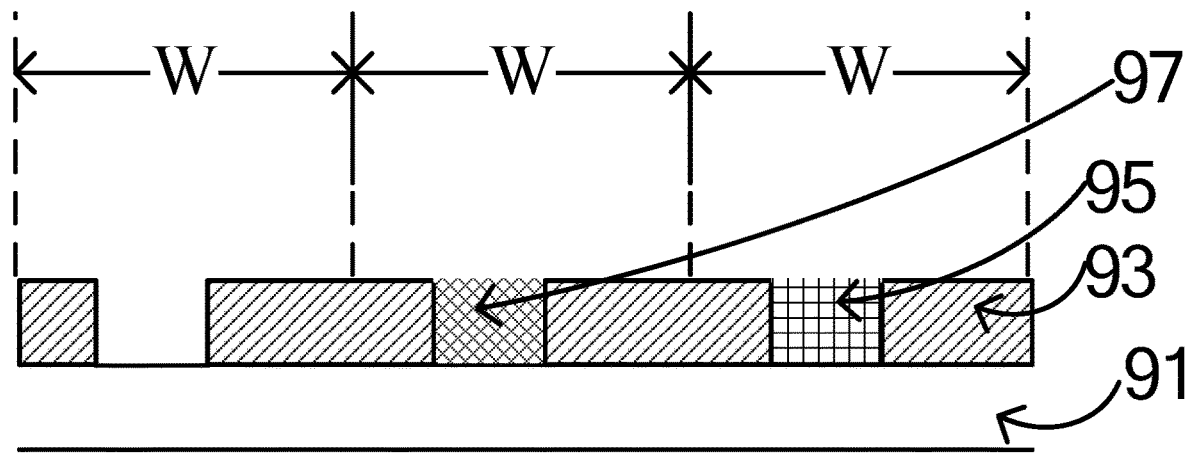

As shown in FIG. 9J, by using a device, such as an exposure machine, to perform a photolithography process on a green photoresist layer 96 based on the third photomask, the green filter layer 97 is obtained.

Step 11 of coating a green color resist material layer.

Figure 9K:
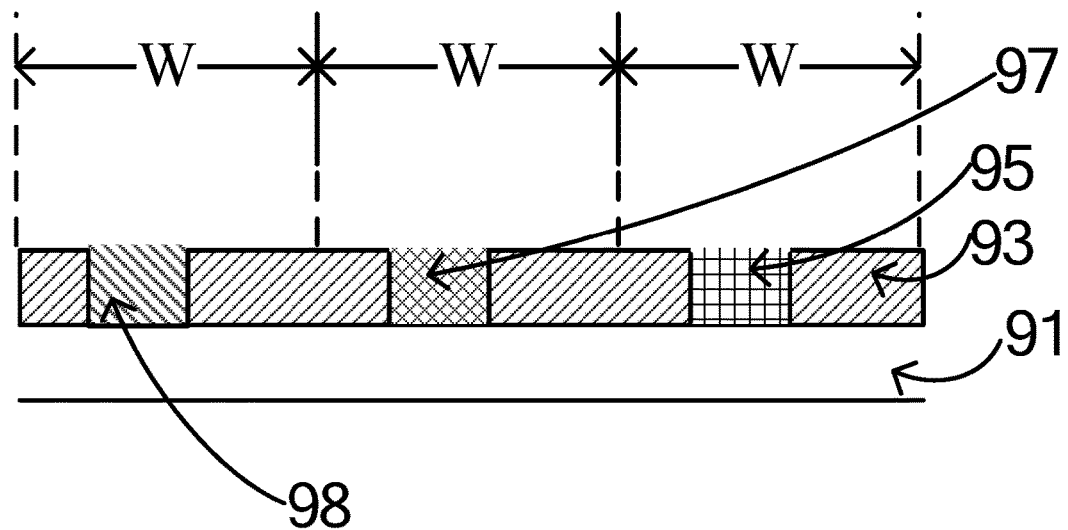

As shown in FIG. 9K, a blue photoresist layer 98 is coated on the entire surface of the base substrate obtained in step 10, wherein material of the blue photoresist layer is a positive photoresist, and the regions shielded by the photomask remain.

Step 12 of aligning the fourth photomask with the base substrate.

Figure 9L:
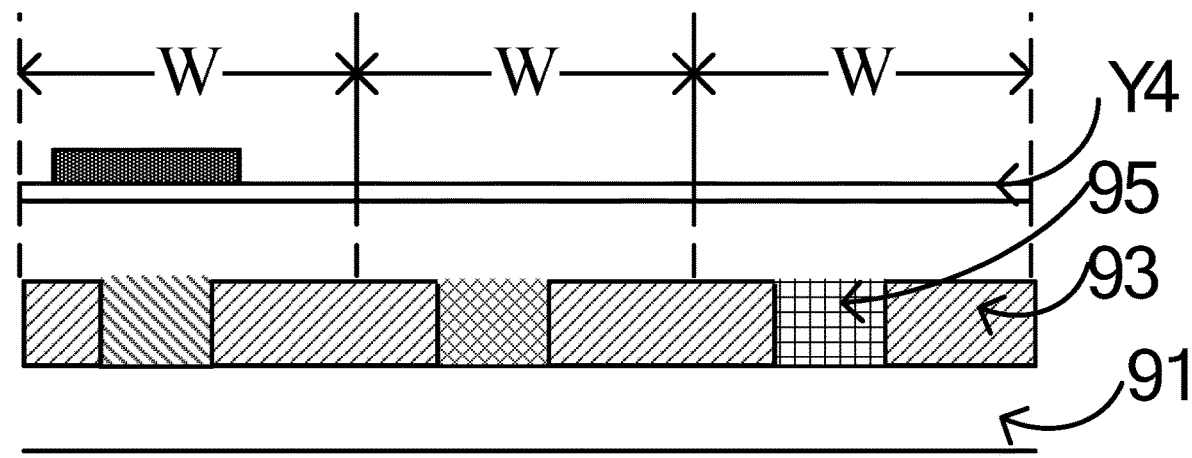

As shown in FIG. 9L, the fourth photomask Y4 is used, and each repeating region Z of the fourth photomask Y4 only corresponding to the pixel region W to which blue sub-pixels correspond adopts the design of the embodiment as shown in FIG. 5C and FIG. 5D. The fourth photomask Y4 is aligned with the base substrate obtained in step 11.

Step 13 of patterning the blue photoresist layer.

Figure 9M:
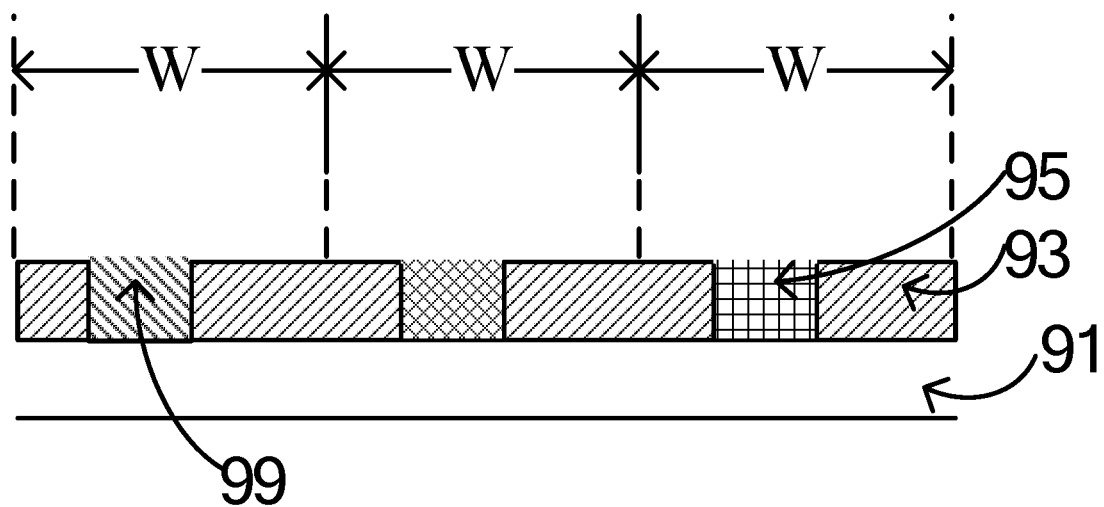

As shown in FIG. 9M, by using a device, such as an exposure machine, to perform a photolithography process on a blue photoresist layer 98 based on the fourth photomask, the blue filter layer 99 is obtained.

Step 14 of preparing a support pillar.

Figure 9N:
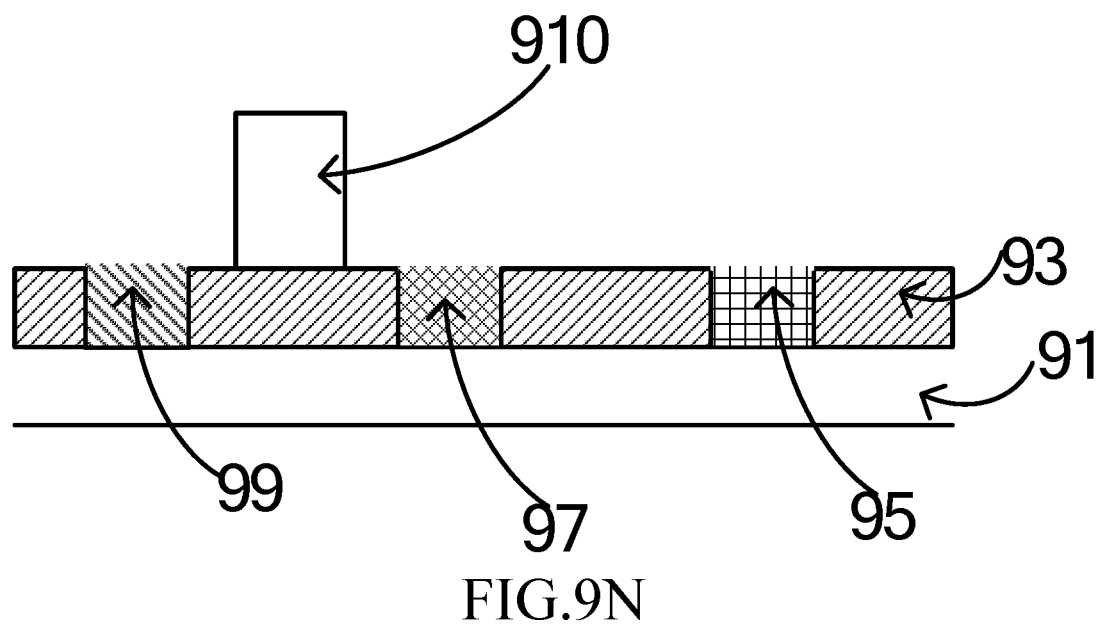

As shown in FIG. 9N, a supporting pillar 910 is prepared on the black matrix of the base substrate obtained in step 13.

Step 15 of prepare a planarization layer and a common electrode layer.

Figure 9O:
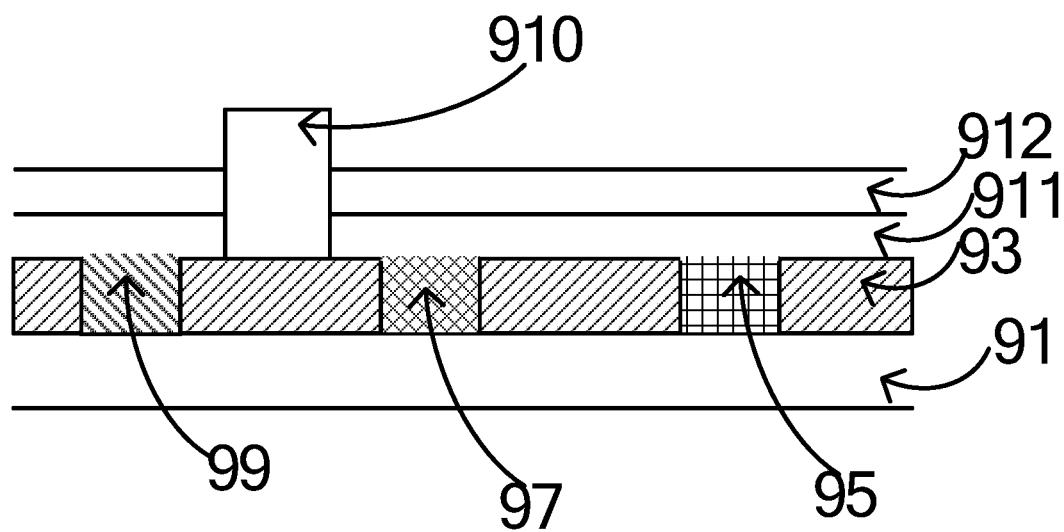

As shown in FIG. 9O, on the base substrate obtained in step 14, macromolecular organic particles are used to sequentially prepare a planarization layer 911, and a transparent conductive material, such as TIO, is used to prepare a common electrode layer 912 on the planarization layer 911.

Figure 6:
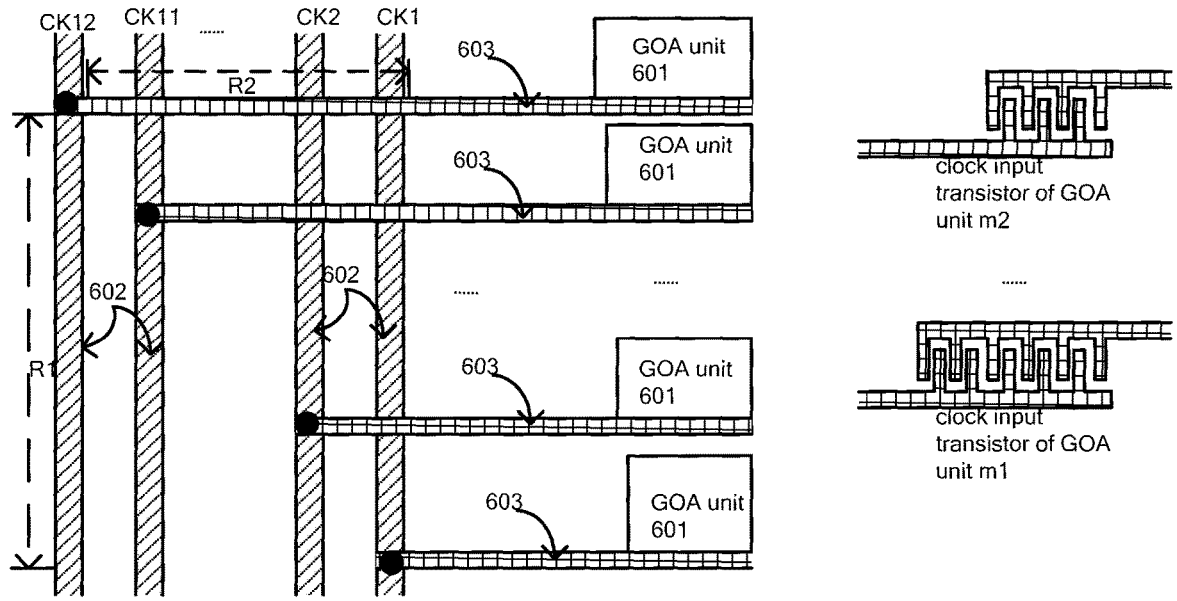
FIG. 6 is a schematic circuit diagram of a display panel provided by an embodiment of the present disclosure.

In one embodiment, for the technical problem of CK impedance difference, as shown in FIG. 6, in a non-display region where the sealant frame 53 is located, the display panel is provided with:

m GOA units 601 arranged in a column direction, wherein each of the GOA units 601 includes a pull-up module, and each of the pull-up modules includes a clock input transistor connected to a clock signal;

n clock signal lines 602 extending in the column direction and arranged in parallel; and m clock signal connection lines 603 extending in a row direction and arranged in parallel, wherein the clock signal connection lines 603 have one-to-one correspondence to the GOA units 601, for connecting the clock input transistor of the pull-up module in each of the GOA units 601 to a corresponding one of the clock signal lines 602;

wherein the n clock signal lines include an clock signal line n1 and an clock signal line n2, the clock signal line n2 is formed near a side of the clock signal line n1 away from the GOA units, and a voltage drop value connected to the clock input transistor of the pull-up module in the GOA unit m1 of the clock signal line n1 is greater than a voltage drop value connected to the clock input transistor of the pull-up module in the GOA unit m2 of the clock signal line n2. n1 is different from n2, and belongs to 1 to n. m1 is different from m2, and belongs to 1 to m.

A 7680*4320 resolution display panel is taken as an example. The display panel includes 4320 GOA units 601 and 12 clock signal lines 602 (CK1 to CK12 in FIG. 6), and each of the clock signal line 602 is connected to 360 GOA units 601. Then it can be foreseen that in the column direction and the row direction, the difference in voltage drop value between the GOA unit 601 (m2) connected to CK12 and the GOA unit 601 (m1) connected to CK1 is the product of the sum of resistance R1 and R2 and the current I. The sum of resistance R1 and resistance R2 can reach the level of kiloohms. Based on the current situation, this disclosure does not employs the improvement of the voltage drop value of the clock signal lines, and originally proposes to adjust parameters of the clock input transistors (that is, the thin film transistors connected to the external clock signal) in the GOA units to change the corresponding voltage drop value thereof.

This embodiment provides a display panel including m GOA units arranged in a column direction, wherein each of the GOA units includes a pull-up module, and each of the pull-up modules includes a clock input transistor connected to a clock signal; n clock signal lines extending in the column direction and arranged in parallel; and m clock signal connection lines extending in a row direction and arranged in parallel, wherein the clock signal connection lines have one-to-one correspondence to the GOA units, for connecting the clock input transistor of the pull-up module in each of the GOA units to a corresponding one of the clock signal lines; wherein the n clock signal lines include an clock signal line n1 and an clock signal line n2, the clock signal line n2 is formed near a side of the clock signal line n1 away from the GOA units, and a voltage drop value connected to the clock input transistor of the pull-up module in the GOA unit m1 of the clock signal line n1 is greater than a voltage drop value connected to the clock input transistor of the pull-up module in the GOA unit m2 of the clock signal line n2. Based on this circuit structure, by adjusting the voltage drop values of the clock input transistors in different GOA units, the voltage drop values caused by the different lengths of the clock signal lines and the clock signal connection lines are compensated, so that the voltage drop value between each GOA unit and the clock driving chip is approximately the same, thereby alleviating the CK impedance difference existing in the 8K ultra-high resolution electronic device, and improving the technical problem of the difference of the output signal of the GOA units existing in the 8K ultra-high resolution electronic device.

In one embodiment, the display panel includes an active layer, a first metal layer, and a second metal layer. The active layer is patterned to form a channel region of the transistor. The first metal layer is patterned to form a gate and a gate scan line and a clock signal line. The second metal layer is patterned to form a clock signal connection line, a source and a drain of the transistor, etc. The CK signal is connected to the source of the clock input transistor in the GOA unit, and the CK signal is input through the clock signal line (first metal layer), is transmitted to the clock signal connection line (second metal layer) through a via hole, and is connected to the source of the clock input transistor.

In one embodiment, the parameters of the clock input transistors include multiple dimensions, such as the sizes of the transistors, the resistivity of the layer material, and the thicknesses of the layers. For the clock input transistors connected to the different clock signal lines, only one parameter or multiple parameters may be adjusted, so that the voltage drop value between the GOA units connecting all of the clock signal lines and the clock driving chips is approximately the same.

In one embodiment, the voltage drop values of the clock input transistors connected to the same clock signal line but belonging to the different GOA units are the same.

In one embodiment, size parameters of the clock input transistors connected to the different clock signal lines are different. That is, a size of the sub-transistor of the clock input transistor of the pull-up module in the GOA unit m1 is larger than a size of the sub-transistor of the clock input transistor of the pull-up module in the GOA unit m2.

In an embodiment, as shown in FIG. 6, the clock input transistor includes a plurality of sub-transistors connected in an array. A number of sub-transistors of the clock input transistor of the pull-up module in the GOA unit m1 is greater than a number of sub-transistors of the clock input transistor of the pull-up module in the GOA unit m2. In an actual preparation process, each transistor is implemented by using a series of sub-transistors in an array. The more the number of sub-transistors in series is, the greater the resistance of the transistor is. Based upon this, in this embodiment, parameters of the sub-transistors of the transistor can be adjusted. In preparation, this embodiment can be obtained only by changing the number of the light-shielding regions of the photomask corresponding to the sub-transistors of the clock input transistor in the different GOA units.

In one embodiment, an area of the source of the clock input transistor of the pull-up module in the GOA unit m1 is larger than an area of the source of the clock input transistor of the pull-up module in the GOA unit m2. Under the condition that active layer parameters, gate parameters, drain parameters (including material resistivity, area, and thickness), and partial source parameters (including material resistivity, and thickness), the larger the area of the source is, the larger the resistance of the transistor is. Based upon this, in this embodiment, the voltage drop value of the transistor can be adjusted. In preparation, this embodiment can be obtained by only changing the area of the light-shielding region of the photomask corresponding to the source of the clock input transistor in the different GOA units.

In one embodiment, the contact area between the source of the clock input transistor of the pull-up module in the GOA unit m1 and the active layer is smaller than the contact area between the source of the clock input transistor of the pull-up module in the GOA unit m2 and the active layer. Under the condition that active layer parameters, gate parameters, drain parameters (including material resistivity, area, and thickness), and source parameters (including material resistivity, area, and thickness) are the same, the smaller the contact area between the source and the active layer the area is, the greater the resistance of the transistor is. Based upon this, in this embodiment, the voltage drop value of the transistor can be adjusted. In preparation, this embodiment can be obtained by only changing an area of the light-transmission regions of the photomask corresponding to a source connection via hole of the clock input transistor in the different GOA units.

In an embodiment, an area of the drain of the clock input transistor of the pull-up module in the GOA unit m1 is larger than an area of the drain of the clock input transistor of the pull-up module in the GOA unit m2. Under the condition that active layer parameters, gate parameters, source parameters (including material resistivity, area, and thickness), and partial drain parameters (including material resistivity, and thickness) are the same, the larger the area of the drain is, the larger the resistance of the transistor is. Based upon this, in this embodiment, the voltage drop value of the transistor can be adjusted. In preparation, this embodiment can be obtained by only changing the area of the light-shielding region of the photomask corresponding to the drain of the clock input transistor in the different GOA units.

In one embodiment, the contact area between the drain of the clock input transistor of the pull-up module in the GOA unit m1 and the active layer is smaller than the contact area between the drain of the clock input transistor of the pull-up module in the GOA unit m2 and the active layer. Under the condition that active layer parameters, gate parameters, drain parameters (including material resistivity, area, and thickness), and source parameters (including material resistivity, area, and thickness) are the same, the smaller the contact area between the drain and the active layer the area is, the greater the resistance of the transistor is. Based upon this, in this embodiment, the voltage drop value of the transistor can be adjusted. In preparation, this embodiment can be obtained by only changing an area of the light-transmission regions of the photomask corresponding to a drain connection via hole of the clock input transistor in the different GOA units.

In an embodiment, material resistivity of a source drain layer of the clock input transistor of pull-up module in the GOA unit m1 is greater than material resistivity of a source drain layer of the clock input transistor of pull-up module in the GOA unit m2. Under the condition that active layer parameters, gate parameters, partial drain parameters (including area and thickness), and partial source parameters (including area and thickness) are the same, the greater the material resistivity of the source drain layer is, the greater the resistance of the transistor is. Based upon this, in this embodiment, the voltage drop value of the transistor can be adjusted. In preparation, this embodiment can be obtained by only using materials with different resistivities, or changing material ratios of the materials with different resistivities. In one embodiment, materials of the source and the drain provided in the present disclosure include a 4-layer structure, which are titanium (Ti), aluminum (Al), copper (Cu), and titanium (Ti) in order from bottom to top. On the basis that a total layer thickness of aluminum (Al) and copper (Cu) is constant, changing the thicknesses of aluminum (Al) and copper (Cu) can change of the material resistivity of the source drain layer. Since the resistivity of copper is smaller than the resistivity of aluminum, when the metal layer is being deposited, a thick aluminum layer is deposited for the source drain layer of the clock input transistor of the pull-up module in the GOA unit m1, and a thin aluminum layer is deposited for the source drain layer of the clock input transistor of the pull-up module in the GOA unit m2, thereby realizing this embodiment.

In an embodiment, a thickness of a source drain layer of the clock input transistor of pull-up module in the GOA unit m1 is smaller than a thickness of a source drain layer of the clock input transistor of pull-up module in the GOA unit m2. Under the condition that active layer parameters, gate parameters, partial drain parameters (including resistivity and area), and partial source parameters (including resistivity and area) are the same, the smaller the thickness of the source drain layer is, the greater the resistance of the transistor is. Based upon this, in this embodiment, the voltage drop value of the transistor can be adjusted. In preparation, this embodiment can be obtained by only depositing materials of the source and the drain with different thicknesses in different regions.

Figure 7:
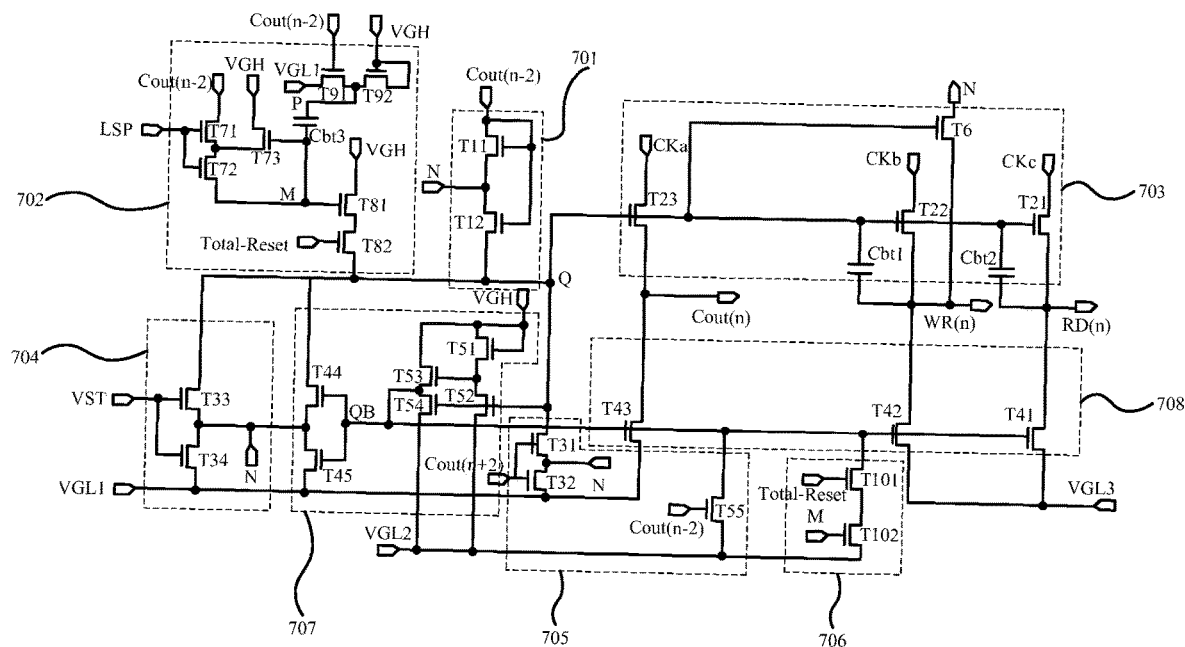
FIG. 7 is a schematic circuit diagram of a GOA circuit provided by an embodiment of the present disclosure.

Moreover, as the resolution of the display panel increases, compensation in real time is required for the signal output by the GOA unit. Based on this, an embodiment of the present disclosure also provides a GOA circuit. The GOA circuit provided by the embodiment of the present disclosure includes m stage GOA units, as shown in FIG. 7, wherein the GOA unit n includes a pull-up control module 701, a logical addressing module 702, a pull-up module 703, a first pull-down module 704, a second pull-down module 705, a third pull-down module 706, a first pull-down maintenance module 707, and a second pull-down maintenance module 708.

The pull-up control module 701 is connected to a first node Q, and is configured to pull up a potential of the first node Q during a display period.

The logical addressing module 702 includes a second node M. The logical addressing module is connected to the first node, is configured to pull up a potential of the second node twice during the display period, and pull up the potential of the first node by the second node during a blank period.

The pull-up module 703 is connected to the first node Q, and is configured to pull up a potential of a stage n stage transmission signal Cout (n), a first output signal WR (n), and a second output signal RD (n).

The first pull-down module 704 is connected to the first node Q and is configured to pull down the potential of the first node Q during the blank period.

The second pull-down module 705 is connected to the first node Q and a third node QB, and is configured to pull down the potential of the first node Q and a potential of the third node QB respectively during the display period.

The third pull-down module 706 is connected to the third node QB and the second pull-down module 705, and is configured to pull down the potential of the third node QB during the blank period.

The first pull-down maintenance module 707 includes third node QB. The first pull-down maintenance module 707 is connected to the first node Q and the first pull-down module 704 for maintaining the low potential of the first node Q.

The second pull-down maintaining module 708 is connected to the third node QB and the pull-up module 703, and is configured to maintain the low potential of the stage n stage transmission signal Cout (n), the first output signal WR (n) and the second output signal RD (n).

It is required for the display panel to pass through a display period (Programing) and a blank period (Blank) when displaying images, wherein the display period is an actual display period of each frame image, and the blank period is the time period between the actual display periods of the sequential frame images.

In the embodiment as shown in FIG. 7, a tenth transistor T23, an eleventh transistor T22, and a twelfth transistor T21 in the pull-up module 703 are the above clock input transistors. In the embodiment as shown in FIG. 7, it is required for the clock driving chip to input 3 clock signals CKa, CKb and CKc to the same GOA unit. At this time, each clock signal line in FIG. 6 is divided into 3 sub-clock signal lines for transmitting CKa, CKb And CKc, and each clock signal connection line is divided into three sub-clock signal connection lines, respectively connecting the clock signals CKa, CKb, and CKc to the corresponding clock input transistors.

In this embodiment, the potential of the second node M is raised twice during the display period, so that the charging rate of the first node Q is ensured during the blank period, thereby increasing the threshold voltage margin allowed by the GOA circuit, increasing the stability of the GOA circuit, and reducing the development difficulty in the transistor manufacturing process.

As shown in FIG. 7, the pull-up control module 701 includes a first transistor T11 and a second transistor T12. A gate and a first electrode of the first transistor T11 and a gate of the second transistor T12 are connected to a stage n−2 stage transmission signal Cout (n−2), a second electrode of the first transistor T11 is connected to a first electrode of the second transistor T12, and a second electrode of the second transistor T12 is connected to the first node Q.

The logical addressing module 702 includes a third transistor T91, a fourth transistor T92, a fifth transistor T71, a sixth transistor T72, a seventh transistor T73, an eighth transistor T81, a ninth transistor T91 and a first storage capacitor Cbt3. A gate of the third transistor of T91 is connected to the stage n−2 stage transmission signal Cout (n−2), A first electrode of the third transistor T91 is connected to a first low potential signal VGL1, A second electrode of the third transistor T91 is connected to a first electrode of the fourth transistor T92. A gate and a second electrode of the fourth transistor T92 are both connected to a high potential signal VGH. A gate of the fifth transistor T71 is connected to a first input signal LSP. A first electrode of the fifth transistor T71 is connected to the stage n−2 stage transmission signal Cout (n−2). A second electrode of the fifth transistor T71 is connected to A first electrode of the sixth transistor T72 and a first electrode of the seventh transistor T73. A gate of the sixth transistor T72 is connected to the first input signal. A second electrode of the sixth transistor T72 and a gate of the seventh transistor T73 are both connected to the second node M. A second electrode of the seventh transistor T73 is connected to the high potential signal VGH. A gate of the eighth transistor T81 is connected to the second node M. A first electrode of the eighth transistor T81 is connected to the high potential signal VGH. A second electrode of the eighth transistor T81 is connected to a first electrode of the ninth transistor T91. A gate of the ninth transistor T91 is connected to a reset signal (Total-Reset). A second electrode of the ninth transistor T91 is connected to the first node Q. A first plate of the first storage capacitor Cbt3 is connected to the second electrode of the third transistor T91. A second plate is connected to the second node M.

The pull-up module 703 includes a tenth transistor T23, an eleventh transistor T22, a twelfth transistor T21, a thirteenth transistor T6, a second storage capacitor Cbt1 and a third storage capacitor Cbt2. A gate of the tenth transistor T23, a gate of the eleven transistor T22, and a gate of the twelfth transistor T21 are all connected to the first node Q. A first electrode of the tenth transistor T23 is connected to the first clock signal CKa. A second electrode of the tenth transistor T23 is connected to the stage n stage transmission signal Cout (n). A first electrode of the eleventh transistor T22 is connected to the second clock signal CKb. A second electrode of the eleventh transistor T22 is connected to the first output signal WR (n). A first electrode of the twelfth transistor T21 is connected to the third clock signal CKc. A second electrode of the twelfth transistor T21 is connected to the second output signal RD (n). A gate of the thirteenth transistor T6 is connected to the first node Q. A first electrode of the thirteenth transistor T6 is connected to the fourth node N. A second electrode of the thirteenth transistor T6 is connected to the first output signal WR (n). A first plate of the second storage capacitor Cbt1 is connected to the first node Q. A second plate is connected to the first output signal WR (n). A first plate of the third storage capacitor Cbt2 is connected to the first node Q. A second plate is connected to the second output signal RD (n).

The first pull-down module 704 includes a fourteenth transistor T33 and a fifteenth transistor T34. A gate of the fourteenth transistor T33 and a gate of the fifteenth transistor T34 are both connected to a second input signal VST. A first electrode of the fourteenth transistor T33 is connected to the first node Q. A second electrode of the fourteenth transistor T33 is connected to a first electrode of the fifteenth transistor T34 and the fourth node N. A second electrode of the fifteenth transistor T34 is connected to the first low potential signal VGL1.

The second pull-down module 705 includes a sixteenth transistor T31, a seventeenth transistor T32, and an eighteenth transistor T55. A gate of the sixteenth transistor T31 and a gate of the seventeenth transistor T32 are connected to a stage n+2 stage transmission signal Cout(n+2). A first electrode of the sixteenth transistor T31 is connected to a first node Q. A second electrode of the sixteenth transistor T31 is connected to a first electrode of the seventeenth transistor T32 and the fourth node N. A second electrode of the seventeenth the transistor T32 is connected to the first low potential signal VGL1. A gate of the eighteenth transistor T55 is connected to the stage n−2 stage transmission signal Cout (n−2). A first electrode of the eighteenth transistor T55 is connected to a second low potential signal VGL2. A first electrode of the eighteenth transistor T55 is connected to the third node QB.

The third pull-down module 706 includes a nineteenth transistor T102 and a twentieth transistor T101. A gate of the nineteenth transistor T102 is connected to the second node. A first electrode of the nineteenth transistor T102 is connected to the second low potential signal VGL2. A second electrode of the nineteenth transistor T102 is connected to a first electrode of the twentieth transistor T101. A gate of the twentieth transistor T101 is connected to the reset signal (Total-Reset). A second electrode of the twentieth transistor T101 is connected to the third node QB.

The first pull-down sustaining module 707 includes a twenty-first transistor T44, a twenty-second transistor T45, a twenty-third transistor T51, a twenty-fourth transistor T52, a twenty-fifth transistor T53, and a twenty-sixth transistor T54. A gate of the twenty-first transistor T44 and a gate of the twenty-second transistor T45 are connected to the third node QB. A first electrode of the twenty-first transistor T44 is connected to the first node Q. A second electrode of the twenty-first transistor T44 is connected to a first electrode of the twenty-second transistor T45 and the fourth node N. A second electrode of the twenty-second transistor T45 is connected to the first low potential signal VGL1. A gate and a first electrode of the twenty-third transistor T51 is connected to the high potential signal VGH. A second electrode of the twenty-third transistor T51 is connected to a first electrode of the twenty-fourth transistor T52. A gate of the twenty-fourth transistor T52 is connected to the first node Q. A second electrode of the twenty-fourth transistor T52 is connected to the second low potential signal VGL2. A gate of the twenty-fifth transistor T53 is connected to a second electrode of the twenty-third transistor T51. A first electrode of the twenty-fifth transistor T53 is connected to the high potential signal VGH. A second electrode of the twenty-fifth transistor T53 is connected to a first electrode of the twenty-sixth transistor T54 and the third node QB. A gate of the twenty-sixth transistor T54 is connected to the first node Q. A second electrode of the twenty-sixth transistor T54 is connected to the second low potential signal VGL2.

The second pull-down maintenance module 708 includes a twenty-seventh transistor T43, a twenty-eighth transistor T42, and a twenty-ninth transistor T41. A gate of the twenty-seventh transistor T43, a gate of the twenty-eighth transistor T42, and a gate of the twenty-ninth transistor T41 are connected to the third node QB. A first electrode of the twenty-seventh transistor T43 is connected to the first low-potential signal VGL1. A second electrode of the twenty-seventh transistor T43 is connected to the stage n stage transmission signal Cout (n). A first electrode of the twenty-eighth transistor T42 is connected to the third low potential signal VGL3. A second electrode of the twenty-eighth transistor T42 is connected to the first output signal WR (n). A first electrode of the twenty-ninth transistor T41 is connected to the third low potential signal VGL3. A second electrode of the twenty-ninth transistor T41 is connected to the second output signal RD (n).

In the GOA circuit of the present disclosure, there are m stage GOA units, in which the stage transmission signal output by the stage n GOA unit is the stage n stage transmission signal Cout (n), 2≤n≤m, and n is an integer. The stage n–2 stage transmission signal Cout(n–2) is the stage transmission signal 2 stages before the n stage transmission signal Cout (n), (1 stage interval therebetween), and the stage n+2 stage transmission signal Cout (n+2) is the stage transmission signal 2 stages before the stage n cascade signal Cout (n), (1 stage interval therebetween).

In the GOA circuit of the present disclosure, the first input signal LSP, the second input signal VST, and the reset signal Total-Reset are all provided by an external timing device.

Figure 8A:
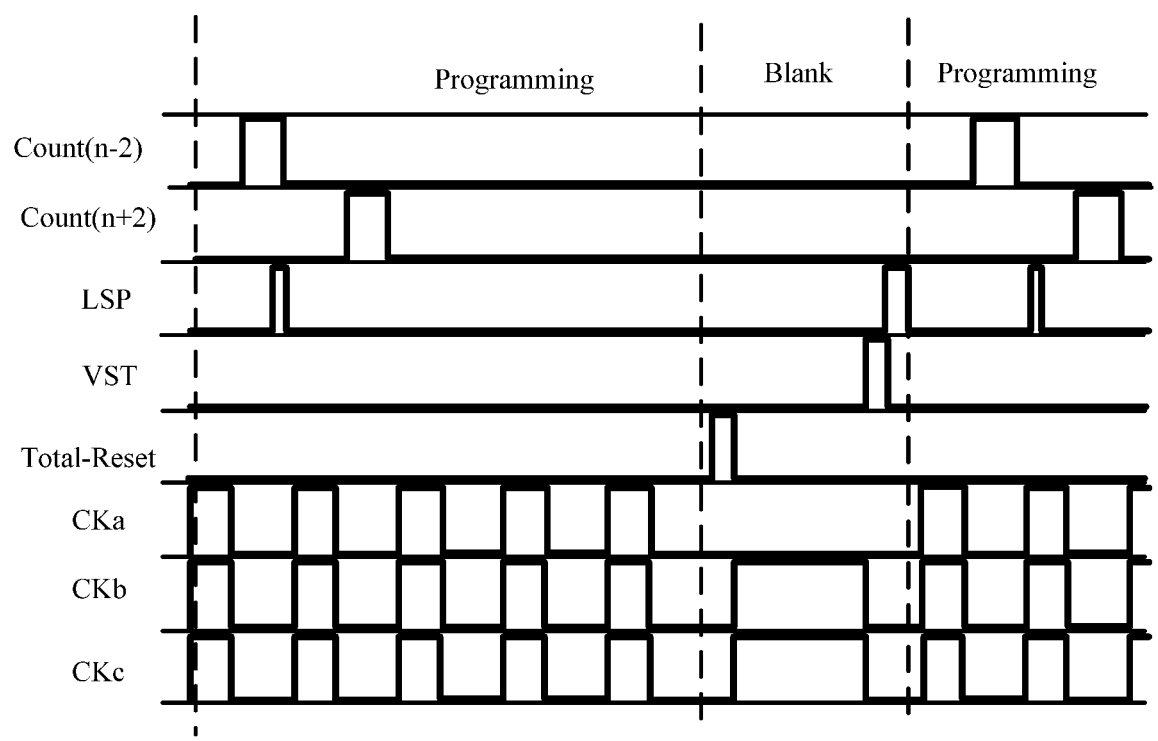
FIG. 8A to FIG. 8C are timing diagrams of embodiments of the present disclosure.

The GOA circuit provided in this embodiment is a real-time compensation circuit, wherein it is required for the GOA to output a normal drive timing display image in the display period corresponding to each frame, and to output a wide pulse timing for the threshold voltage Vth detection in the blank period between each frame. FIG. 8A shows the timing of the signals of the GOA circuit in the embodiment of the present disclosure in the display period (Programing) and the blank period (Blank), wherein the voltage setting values of the signals at high potentials and low potentials are as shown in Table 1.

TABLE 1

| GOA signal | Setting voltage | |
|---|---|---|
| | Low potential | High potential |
| Cout(n − 2) | −13 | +20 |
| Cout(n + 2) | −13 | +20 |
| LSP | −13 | +20 |
| VST | −13 | +20 |
| Total-Reset | −13 | +20 |
| CKa | −13 | +20 |
| CKb | −13 | +20 |
| CKc | −13 | +20 |
| VGH | | +20 |
| VGL1 | −13 | |
| VGL2 | −10 | |
| VGL3 | −6 | |

The operation of the GOA circuit in the display period and the blank period is described in detail below with reference to FIG. 8B and FIG. 8C.

Figure 8B:
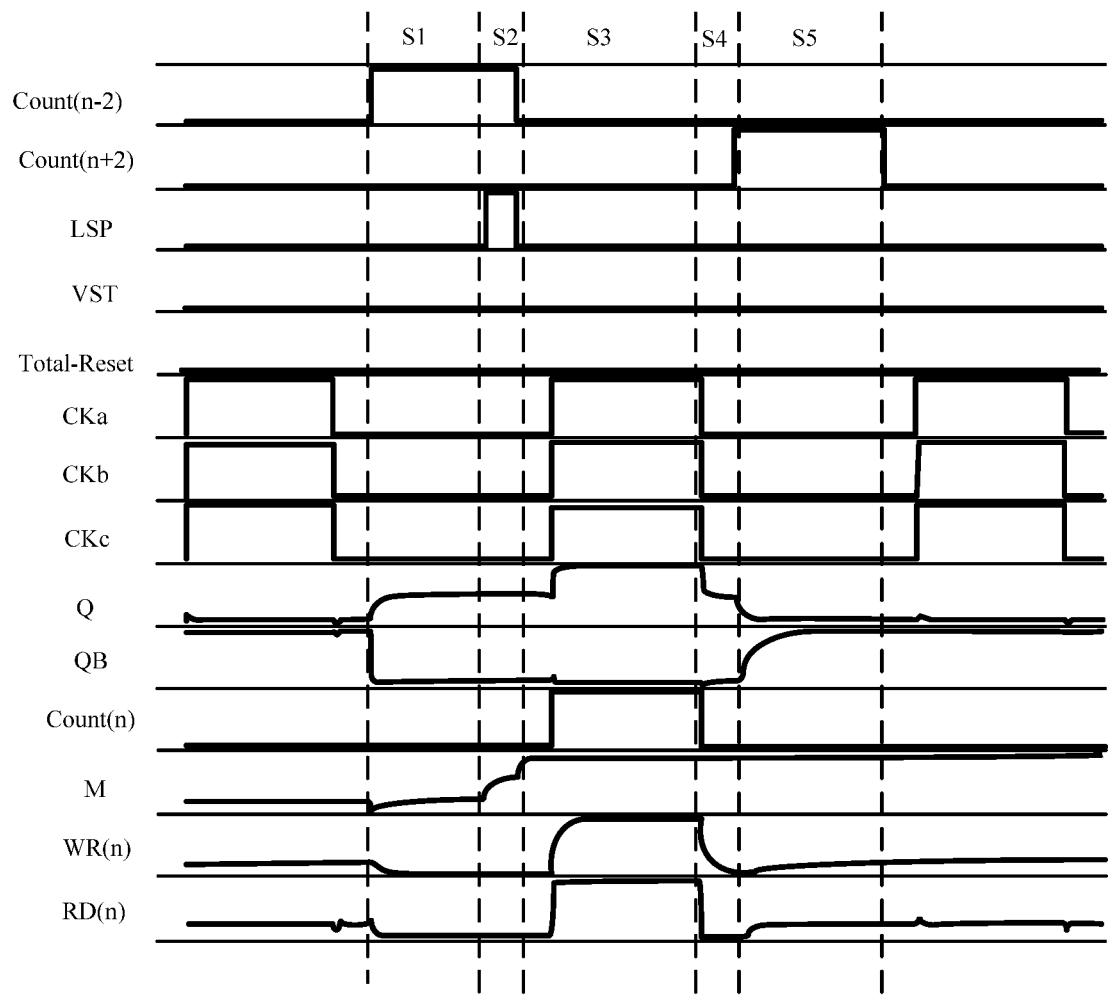

As shown in FIG. 8B, the display period includes a first display stage S1, a second display stage S2, a third display stage S3, a fourth display stage S4, and a fifth display stage S5.

In the first display stage S1, the stage n–2 stage transmission signal Cout (n–2) rises to a high potential, the first transistor T11 and the second transistor T12 are turned on, the first node Q is pulled up to a high potential, and the twenty-fourth transistor T52, the twenty-sixth transistor T54, the tenth transistor T23, the eleventh transistor T22 and the twelfth transistor T21 are turned on. Because the connection between the first node Q and the third node QB constitutes an inverter structure, and the potentials thereof are opposite, the third node QB is at a low potential, the twenty-seventh transistor T43, the twenty-eighth transistor T42, the twenty-ninth transistor T41, the twenty-first transistor T44, and the twenty-second transistor T45 are all turned off, at the same time, the stage n+2 stage transition signal Cout (n+2) is at a low potential, the sixteenth transistor T31 and the seventeenth transistor T32 are turned off, the second input signal VST is at a low potential, and the fourteenth transistor T33 and the fifteenth transistor T34 are turned off. The first timing signal CKa, the second timing signal CKb, and the third timing signal CKc are at low potentials, and the stage n stage transmission signal Cout (n), the first output signal WR (n), and the second output signal RD (n) are at low potentials. Since the stage n–2 stage transmission signal Cout (n–2) is at a high potential, the third transistor T91 is turned on, a point P connected to the first plate of the first storage capacitor Cbt3 is reset to a low potential, and, at the same time, a point M connected to the second plate is at a low potential.

In the second display stage S2, the first input signal LSP rises to a high potential, at this time, the stage n–2 stage transmission signal Cout (n–2) maintains a high potential, the second node M is raised to a high potential, and the fourth transistor T92 is turned on, the point P maintains a low potential. Because the reset signal Total-Rest, the second input signal VST, and other signals are at low potentials, the first node Q maintains a high potential, and the third node QB maintains a low potential.

In the third display stage S3, the first input signal LSP is reduced from a high potential to a low potential, the fifth transistor T71 and the sixth transistor T72 are turned off, the stage n−2 stage transmission signal Cout (n−2) changes from a high potential to a low potential, therefore, the third transistor T91 is turned off, and the potential at the point P is switched from a low potential to a high potential. Due to the presence of the first storage capacitor Cbt3, the second node M is coupled and raised to a higher potential. The first timing signal Cka, the second timing signal CKb, and the third timing signal CKc change from a low potential to a high potential, so the potentials of the stage n stage transmission signal Cout (n), the first output signal WR (n), and the second output signal RD (n) are also raised to high potentials. At the same time, due to the presence of the second storage capacitor Cbt1 and the third storage capacitor Cbt2, the first node Q is coupled to a high potential.

In the fourth display stage S4, the first timing signal Cka, the second timing signal CKb, and the third timing signal CKc are switched from a high potential to a low potential, the potentials of the stage n stage transmission signal Cout (n), the first output signal WR (n), and the second output signal RD (n) are pulled to a low potential, and the signal coupling of the first node Q decreases to the potential at the second display stage S2.

In the fifth display stage S5, the stage n+2 stage transmission signal Cout (n+2) rises from a low potential to a high potential, the sixteenth transistor T31 and the seventeenth transistor T32 are turned on, the potential of the first node Q is pulled down to the low potential, the twenty-fourth transistor T52, the twenty-sixth transistor T54, the tenth transistor T23, the eleventh transistor T22 and the twelfth transistor T21 are turned off, the potential of the third node QB is raised to a high potential, the twentieth-seven transistor T43, the twenty-eighth transistor T42, the twenty-ninth transistor T41, the twenty-first transistor T44 and the twenty-second transistor T45 are all turned on, and the first node Q, the stage n stage transmission signal Cout (n), the first output signal WR (n), and the second output signal RD (n) maintain low potentials.

Figure 8C:
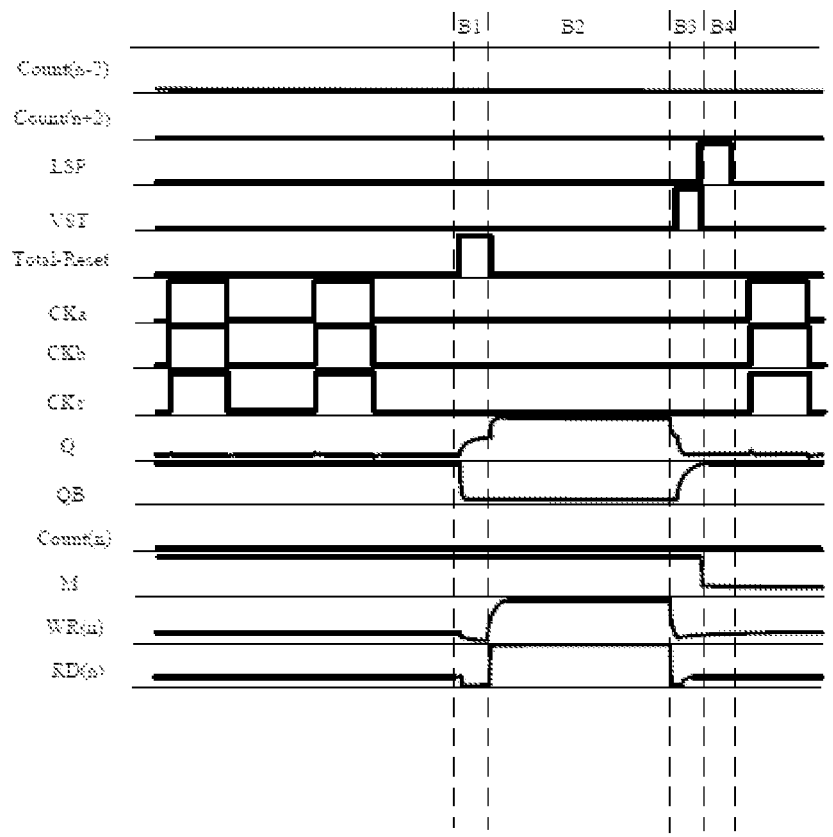

As shown in FIG. 8C, the blank period includes a first blank stage B1, a second blank stage B2, a third blank stage B3, and a fourth blank stage B4.

In the first blank stage B1, the reset signal (Total Reset) rises to a high potential, the ninth transistor T82 is turned on, the potential of the first node Q is pulled to a high potential, the twenty-fourth transistor T52, the twenty-sixth transistor T54, the tenth transistor T23, the eleventh transistor T22, and the twelfth transistor T21 are turned on. Because the connection between the first node Q and the third node QB constitutes an inverter structure, and the potentials thereof are opposite, the third node QB is at a low potential, the twenty-seventh transistor T43, the twenty-eighth transistor T42, the twenty-ninth transistor T41, the twenty-first transistor T44, and the twenty-second transistor T45 are all turned off, at the same time, the stage n+2 stage transition signal Cout (n+2) is at a low potential, the sixteenth transistor T31 and the seventeenth transistor T32 are turned off, the second input signal VST is at a low potential, and the fourteenth transistor T33 and the fifteenth transistor T34 are turned off. The first timing signal Cka, the second timing signal CKb, and the third timing signal CKc are at low potentials, and the stage n stage transmission signal Cout (n), the first output signal WR (n), and the second output signal RD (n) are at low potentials.

In the second blank stage B2, the reset signal (Total Reset) reduces to a low potential, the ninth transistor T82 is turned off, the first timing signal Cka maintains a low potential, the second timing signal CKb and the third timing signal CKc rise to a high potential, and the stage n stage transmission signal Cout (n) maintains a low potential, and the first output signal WR (n) and the second output signal RD (n) are at high potentials. The first node Q is coupled to a high potential.

In the third blank stage B3, the second input signal VST rises from a low potential to a high potential, the fourteenth transistor T33 and the fifteenth transistor T34 are turned on, the potential of the first node Q is pulled down to a low potential, the twenty-fourth transistor T52, the twenty-sixth transistor T54, the tenth transistor T23, the eleventh transistor T22 and the twelfth transistor T21 are turned off, the potential of the third node QB is raised to a high potential, the twentieth-seven transistor T43, the twenty-eighth transistor T42, the twenty-ninth transistor T41, the twenty-first transistor T44 and the twenty-second transistor T45 are all turned on, the first node Q, the first output signal WR (n) and the second output signal RD (n) are pulled down to a low potential, and the stage n stage transmission signal Cout (n) maintains a low potential.

In the fourth blank stage B4, the first input signal LSP rises to a high potential, and the fifth transistor T71 and the sixth transistor T72 are turned on. Because the stage n−2 stage signal Cout (n−2) is at a low potential, the second node M is reset to a low potential, and the eighth transistor T81 is turned off. The first node Q, the stage n stage transmission signal Cout (n), the first output signal WR (n), and the second output signal RD (n) maintain low potentials.

The GOA circuit provided by the embodiment of the present disclosure is a real-time compensation type GOA circuit. Through the above process, a driving signal is provided for the scanning line, so that the display panel displays images.

In the above process, the third transistor T91 and the fourth transistor T92 are disposed on a side near the first plate of the first storage capacitor Cbt3. In the first display stage S1, the third transistor T91 and the fourth transistor T92 are both turned on, so that the potentials of the point P and the second node M are at low potentials. In the second display stage S2, the third transistor T91 and the fourth transistor T92 are both turned on, the point P maintains at a low potential, and the second node M is pulled up for the first time. In the third display stage S3, the third transistor T91 is turned off, the fourth transistor T92 is turned on, and the potential of the point P is pulled up. Due to the coupling effect, the potential of the second node M is pulled up for a second time. Therefore, in the first blank stage B1, the potential of the first node Q is pulled higher than that of the prior art, and the charging rate is ensured, thereby increasing the threshold voltage margin allowed by the GOA circuit, increasing the stability of the GOA circuit, and reducing the development difficulty in the transistor manufacturing process.

The present disclosure provides an electronic device including a display panel provided by the above embodiments:

In an embodiment, the electronic device includes a display panel. The display panel includes:

m GOA units arranged in a column direction, wherein each of the GOA units includes a pull-up module, and each of the pull-up modules includes a clock input transistor connected to a clock signal;

n clock signal lines extending in the column direction and arranged in parallel; and m clock signal connection lines extending in a row direction and arranged in parallel, wherein the n clock signal connection lines have one-to-one correspondence to the GOA units, for connecting the clock input transistor of the pull-up module in each of the GOA units to a corresponding one of the clock signal lines;

wherein the clock signal lines include an clock signal line n1 and an clock signal line n2, the clock signal line n2 is formed near a side of the clock signal line n1 away from the GOA units, and a voltage drop value connected to the clock input transistor of the pull-up module in the GOA unit m1 of the clock signal line n1 is greater than a voltage drop value connected to the clock input transistor of the pull-up module in the GOA unit m2 of the clock signal line n2.

In the electronic device of an embodiment, a size of the clock input transistor of the pull-up module in the GOA unit m1 is larger than a size of the clock input transistor of the pull-up module in the GOA unit m2.

In the electronic device of an embodiment, each of the clock input transistors includes a plurality of sub-transistors connected in an array, and a number of the sub-transistors of the clock input transistor of the pull-up module in the GOA unit m1 is greater than a number of the sub-transistors of the clock input transistor of the pull-up module in the GOA unit m2.

In the electronic device of an embodiment, an area of a source of the clock input transistor of the pull-up module in the GOA unit m1 is larger than an area of a source of the clock input transistor of the pull-up module in the GOA unit m2; and/or an area of a drain of the clock input transistor of the pull-up module in the GOA unit m1 is larger than an area of a drain of the clock input transistor of the pull-up module in the GOA unit m2.

In the electronic device of an embodiment, a contact area between a source of the clock input transistor of the pull-up module in the GOA module m1 and an active layer is smaller than that a contact area between a source of the clock input transistor of the pull-up module in the GOA module m2 and the active layer.

In the electronic device of an embodiment, the GOA unit n includes:

a pull-up control module connected to a first node, and configured to pull up a potential of the first node during a display period;

a logical addressing module including a second node, wherein the logical addressing module is connected to the first node, is configured to pull up a potential of the second node twice during the display period, and pull up the potential of the first node by the second node during a blank period;

the pull-up module connected to the first node and configured to pull up a potential of a stage n stage transmission signal, a first output signal and a second output signal;

a first pull-down module connected to the first node, and configured to pull down the potential of the first node during the blank period;

a second pull-down module connected to the first node and a third node, and configured to pull down the potential of the first node and a potential of the third node respectively during the display period;

a third pull-down module connected to the third node and the second pull-down module, and configured to pull down the potential of the third node during the blank period;

a first pull-down maintenance module including the third node, wherein the first pull-down maintenance module is connected to the first node and the first pull-down module for maintaining the low potential of the first node;

a second pull-down maintenance module connected to the third node and the pull-up module, and configured to maintain the low potential of the stage n stage transmission signal, the first output signal, and the second output signal.

In the electronic device of an embodiment, the pull-up control module includes a first transistor and a second transistor; a gate and a first electrode of the first transistor and a gate of the second transistor all are connected to a stage n−2 signal transmission; a second electrode of the first transistor is connected to a first electrode and a fourth node of the second transistor; and a second electrode of the second transistor is connected to the first node.

In the electronic device of an embodiment, material resistivity of a source drain layer of the clock input transistor of the pull-up module in the GOA unit m1 is greater than material resistivity of a source drain layer of the clock input transistor of the pull-up module in the GOA unit m2.

In the electronic device of an embodiment, a thickness of a source drain layer of the clock input transistor of the pull-up module in the GOA unit m1 is smaller than a thickness of a source drain layer of the clock input transistor of the pull-up module in the GOA unit m2.

In the electronic device of an embodiment, a contact area between a source of the clock input transistor of the pull-up module in the GOA module m1 and an active layer is smaller than that a contact area between a source of the clock input transistor of the pull-up module in the GOA module m2 and the active layer.

Based upon the above embodiments, it is known that:

The present disclosure provides a display panel and an electronic device. The display panel includes a first substrate; a second substrate disposed opposite the first substrate; a support pillar formed on the first substrate; and a liquid crystal filled in a sealed space formed between the first substrate and the second substrate; wherein in a contact region contacting the support pillar, a contact layer of the first substrate contacting the support pillar forms a protrusion-depression pattern, and the protrusion-depression pattern increases a contact area between the contact layer and the support pillar. Based on this structure, the contact area between the support pillar and the bottom layer is increased, and there is no need to change the size of the single sub-pixel, thereby alleviating the technical problem of the existing 8K ultra-high-resolution electronic device that the support pillar easily peels off. Moreover, the clock signal lines include an clock signal line n1 and an clock signal line n2, the clock signal line n2 is formed near a side of the clock signal line n1 away from the GOA units, and a voltage drop value connected to the clock input transistor of the pull-up module in the GOA unit m1 of the clock signal line n1 is greater than a voltage drop value connected to the clock input transistor of the pull-up module in the GOA unit m2 of the clock signal line n2. Based on this circuit structure, by adjusting the voltage drop values of the clock input transistors in different GOA units, the voltage drop values caused by the different lengths of the clock signal lines and the clock signal connection lines are compensated, so that the voltage drop value between each GOA unit and the clock driving chip is approximately the same, thereby alleviating the CK impedance difference existing in the 8K ultra-high resolution electronic device, and improving the technical problem of the difference of the output signal of the GOA units existing in the 8K ultra-high resolution electronic device.

The display panel and the electronic device provided by the embodiments of the present disclosure are described in detail above. Specific examples are used herein to explain the principles and implementations of the present disclosure. The descriptions of the above embodiments are only used to help understand the technical solutions and core ideas of the present disclosure. Those of ordinary skill in the art should understand that t the technical solutions described in the foregoing embodiments can still be modified, or some of the technical features can be equivalently replaced. These modification and replacement does not deviate the essence of the corresponding technical solutions from the scope of the technical solutions of the embodiments of the present disclosure.

What is claimed is:

1. A display panel comprising:
a first substrate;
a second substrate disposed opposite the first substrate;
a support pillar formed on the first substrate; and
a liquid crystal filled in a sealed space formed between the first substrate and the second substrate;
wherein in a contact region contacting the support pillar, a contact layer of the first substrate contacting the support pillar forms a protrusion-depression pattern, the protrusion-depression pattern increases a contact area between the contact layer and the support pillar, and the protrusion-depression pattern includes a target pattern formed by at least one of protrusions, depressions, or a combination of protrusions and depressions of the contact layer;
in a non-display area, the display panel is also provided with:
m GOA units arranged in a column direction, wherein each of the GOA units includes a pull-up module, and each of the pull-up modules includes a clock input transistor connected to a clock signal;
n clock signal lines extending in the column direction and arranged in parallel; and
m clock signal connection lines extending in a row direction and arranged in parallel, wherein the clock signal connection lines have one-to-one correspondence to the GOA units, for connecting the clock input transistor of the pull-up module in each of the GOA units to a corresponding one of the clock signal lines;
wherein the n clock signal lines include a clock signal line n1 and a clock signal line n2, the clock signal line n2 is formed near a side of the clock signal line n1 away from the GOA units, and a voltage drop value connected to the clock input transistor of the pull-up module in the GOA unit m1 of the clock signal line n1 is greater than a voltage drop value connected to the clock input transistor of the pull-up module in the GOA unit m2 of the clock signal line n2, and
wherein the GOA unit n includes:
a pull-up control module connected to a first node, and configured to pull up a potential of the first node during a display period;
a logical addressing module including a second node, wherein the logical addressing module is connected to the first node, is configured to pull up a potential of the second node twice during the display period, and pull up the potential of the first node by the second node during a blank period;
the pull-up module connected to the first node and configured to pull up a potential of a stage n stage transmission signal, a first output signal and a second output signal;
a first pull-down module connected to the first node, and configured to pull down the potential of the first node during the blank period;
a second pull-down module connected to the first node and a third node, and configured to pull down the potential of the first node and a potential of the third node respectively during the display period;
a third pull-down module connected to the third node and the second pull-down module, and configured to pull down the potential of the third node during the blank period;
a first pull-down maintenance module including the third node, wherein the first pull-down maintenance module is connected to the first node and the first pull-down module for maintaining the low potential of the first node;
a second pull-down maintenance module connected to the third node and the pull-up module, and configured to maintain the low potential of the stage n stage transmission signal, the first output signal, and the second output signal.

2. The display panel as claimed in claim 1, wherein each of the clock input transistors includes a plurality of sub-transistors connected in an array, and a number of the sub-transistors of the clock input transistor of the pull-up module in the GOA unit m1 is greater than a number of the sub-transistors of the clock input transistor of the pull-up module in the GOA unit m2.

3. The display panel as claimed in in claim 2, wherein a contact area between a drain of the clock input transistor of the pull-up module in the GOA module m1 and an active layer is smaller than that a contact area between a drain of the clock input transistor of the pull-up module in the GOA module m2 and the active layer.

4. The display panel as claimed in claim 1, wherein the first substrate includes a base substrate, a black matrix formed on the base substrate, and a color filter layer formed on the black matrix, and a support pillar formed on the color filter layer and located in a region where the color filter layer overlaps the black matrix, and the color filter layer has a protrusion-depression pattern formed in the contact region contacting the support pillar.

5. The display panel as claimed in claim 4, wherein the black matrix also forms a protrusion-depression pattern in the contact region between the color filter layer and the support pillar.

6. The display panel as claimed in claim 1, wherein the first substrate includes a base substrate, a drive circuit layer formed on the base substrate, and a planarization layer formed on the drive circuit layer; wherein the support pillar is formed on the planarization layer, and the planarization layer has the protrusion-depression pattern in the contact region contacting the support pillar.

7. The display panel as claimed in claim 1, wherein the first substrate includes a base substrate, a drive circuit layer formed on the base substrate, a color resist layer formed on the drive circuit layer, and a planarization layer formed on the color resist layer; wherein the support pillar is formed on the planarization layer, and the planarization layer has a protrusion-depression pattern in the contact region contacting the support pillar.

8. The display panel as claimed in claim 7, wherein the color resist layer also forms a protrusion-depression pattern in the contact region between the planarization layer and the support pillar.

9. The display panel as claimed in claim 1, wherein a shape of the target pattern is a grid.

10. An electronic device comprising a display panel comprising:

m GOA units arranged in a column direction, wherein each of the GOA units includes a pull-up module, and each of the pull-up modules includes a clock input transistor connected to a clock signal;

n clock signal lines extending in the column direction and arranged in parallel; and m clock signal connection lines extending in a row direction and arranged in parallel, wherein the n clock signal connection lines have one-to-one correspondence to the GOA units, for connecting the clock input transistor of the pull-up module in each of the GOA units to a corresponding one of the clock signal lines;

wherein the clock signal lines include an clock signal line n1 and an clock signal line n2, the clock signal line n2 is formed near a side of the clock signal line n1 away from the GOA units, and a voltage drop value connected to the clock input transistor of the pull-up module in the GOA unit m1 of the clock signal line n1 is greater than a voltage drop value connected to the clock input transistor of the pull-up module in the GOA unit m2 of the clock signal line n2, and wherein the GOA unit n includes:

a pull-up control module connected to a first node, and configured to pull up a potential of the first node during a display period;

a logical addressing module including a second node, wherein the logical addressing module is connected to the first node, is configured to pull up a potential of the second node twice during the display period, and pull up the potential of the first node by the second node during a blank period;

the pull-up module connected to the first node and configured to pull up a potential of a stage n stage transmission signal, a first output signal and a second output signal;

a first pull-down module connected to the first node, and configured to pull down the potential of the first node during the blank period;

a second pull-down module connected to the first node and a third node, and configured to pull down the potential of the first node and a potential of the third node respectively during the display period;

a third pull-down module connected to the third node and the second pull-down module, and configured to pull down the potential of the third node during the blank period;

a first pull-down maintenance module including the third node, wherein the first pull-down maintenance module is connected to the first node and the first pull-down module for maintaining the low potential of the first node;

a second pull-down maintenance module connected to the third node and the pull-up module, and configured to maintain the low potential of the stage n stage transmission signal, the first output signal, and the second output signal.

11. The electronic device as claimed in claim 10, wherein a size of the clock input transistor of the pull-up module in the GOA unit m1 is larger than a size of the clock input transistor of the pull-up module in the GOA unit m2.

12. The electronic device as claimed in claim 11, wherein each of the clock input transistors includes a plurality of sub-transistors connected in an array, and a number of the sub-transistors of the clock input transistor of the pull-up module in the GOA unit m1 is greater than a number of the sub-transistors of the clock input transistor of the pull-up module in the GOA unit m2.

13. The electronic device as claimed in claim 11, wherein an area of a source of the clock input transistor of the pull-up module in the GOA unit m1 is larger than an area of a source of the clock input transistor of the pull-up module in the GOA unit m2; and/or an area of a drain of the clock input transistor of the pull-up module in the GOA unit m1 is larger than an area of a drain of the clock input transistor of the pull-up module in the GOA unit m2.

14. The electronic device as claimed in claim 11, wherein a contact area between a source of the clock input transistor of the pull-up module in the GOA module m1 and an active layer is smaller than a contact area between a source of the clock input transistor of the pull-up module in the GOA module m2 and the active layer.

15. The electronic device as claimed in claim 11, wherein a contact area between a source of the clock input transistor of the pull-up module in the GOA module m1 and an active layer is smaller than a contact area between a source of the clock input transistor of the pull-up module in the GOA module m2 and the active layer.

16. The electronic device as claimed in claim 10, wherein the pull-up control module includes a first transistor and a second transistor; a gate and a first electrode of the first transistor and a gate of the second transistor all are connected to a stage n−2 signal transmission; a second electrode of the first transistor is connected to a first electrode and a fourth node of the second transistor; and a second electrode of the second transistor is connected to the first node.

17. The electronic device as claimed in claim 10, wherein material resistivity of a source drain layer of the clock input transistor of the pull-up module in the GOA unit m1 is greater than material resistivity of a source drain layer of the clock input transistor of the pull-up module in the GOA unit m2.

18. The electronic device as claimed in claim 10, wherein a thickness of a source drain layer of the clock input transistor of the pull-up module in the GOA unit m1 is smaller than a thickness of a source drain layer of the clock input transistor of the pull-up module in the GOA unit m2.

* * * * *